Nov. 18, 1941.  S. BEHAR  2,262,912
ELECTRIC FOOD MIXER
Filed Oct. 6, 1938  11 Sheets-Sheet 1
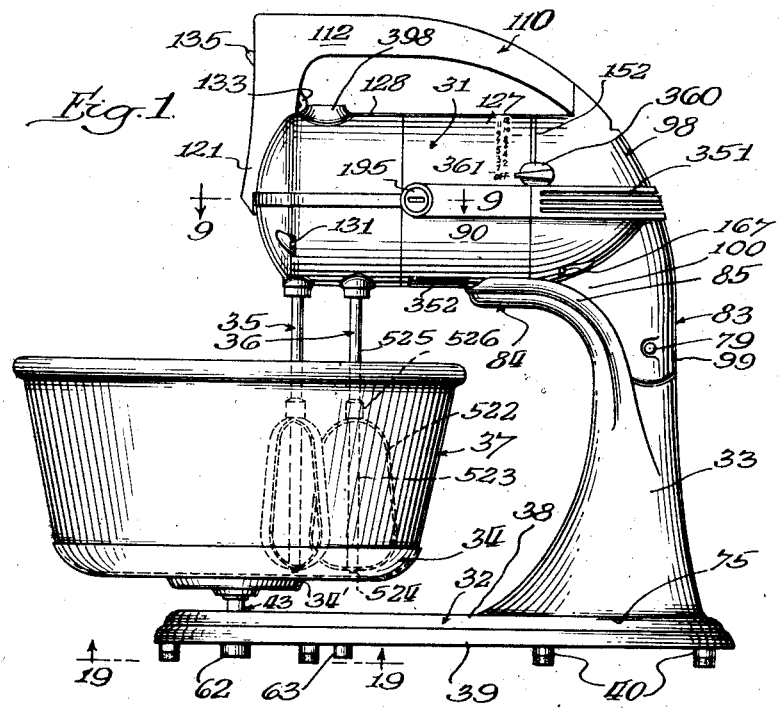
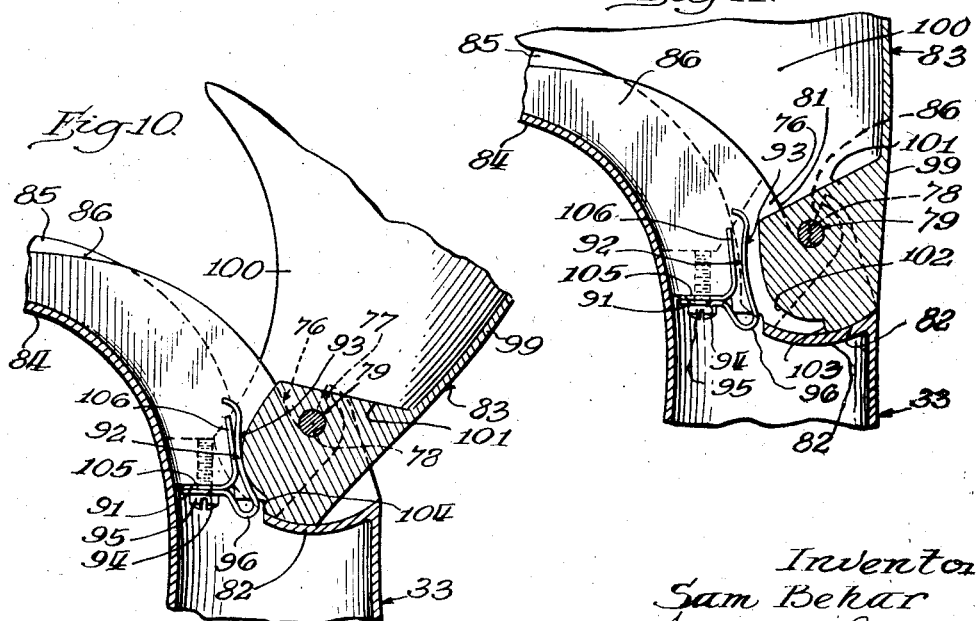
Inventor:
Sam Behar
By Williams, Bradbury,
McCaleb & Hinkle
Attys.

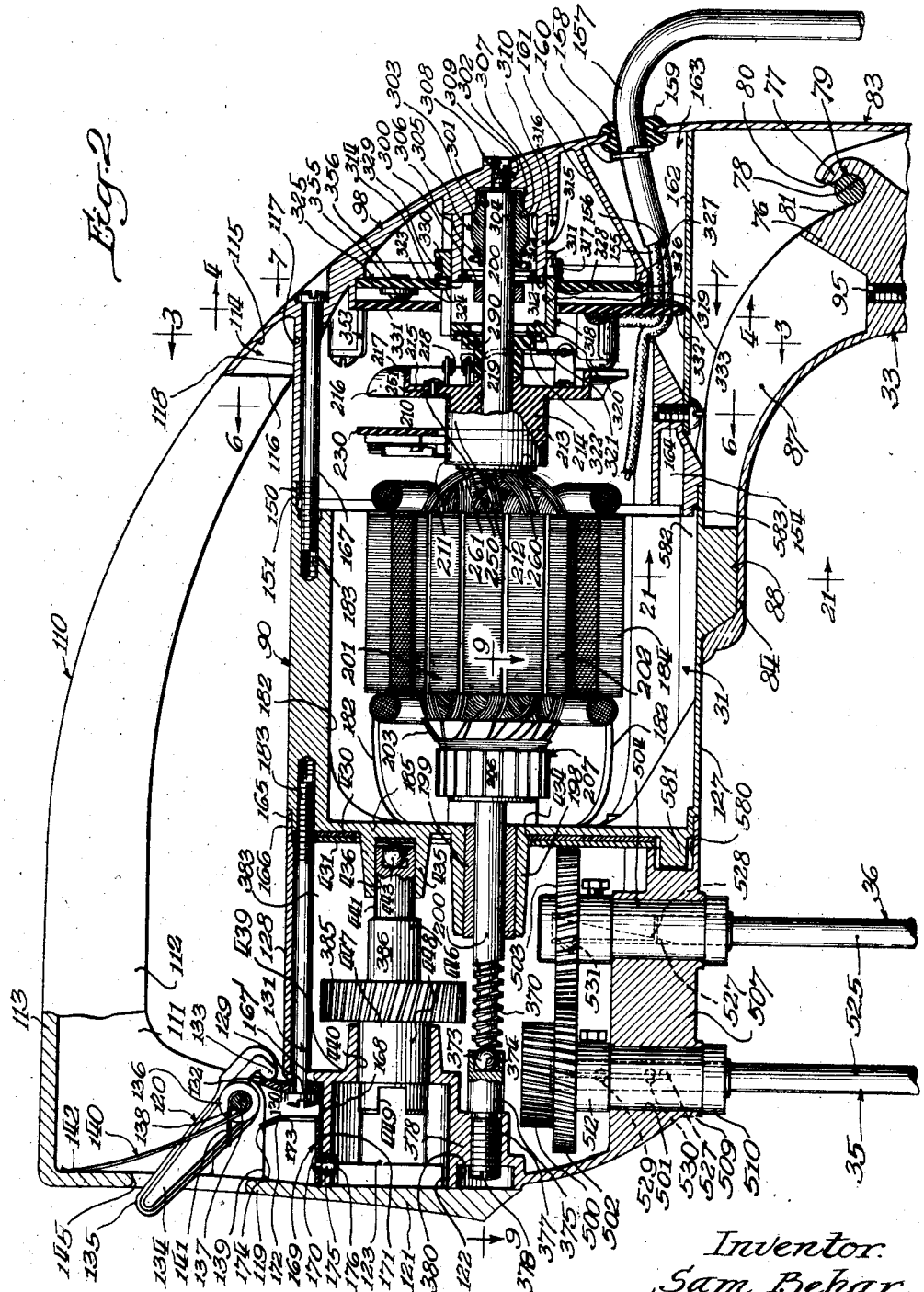

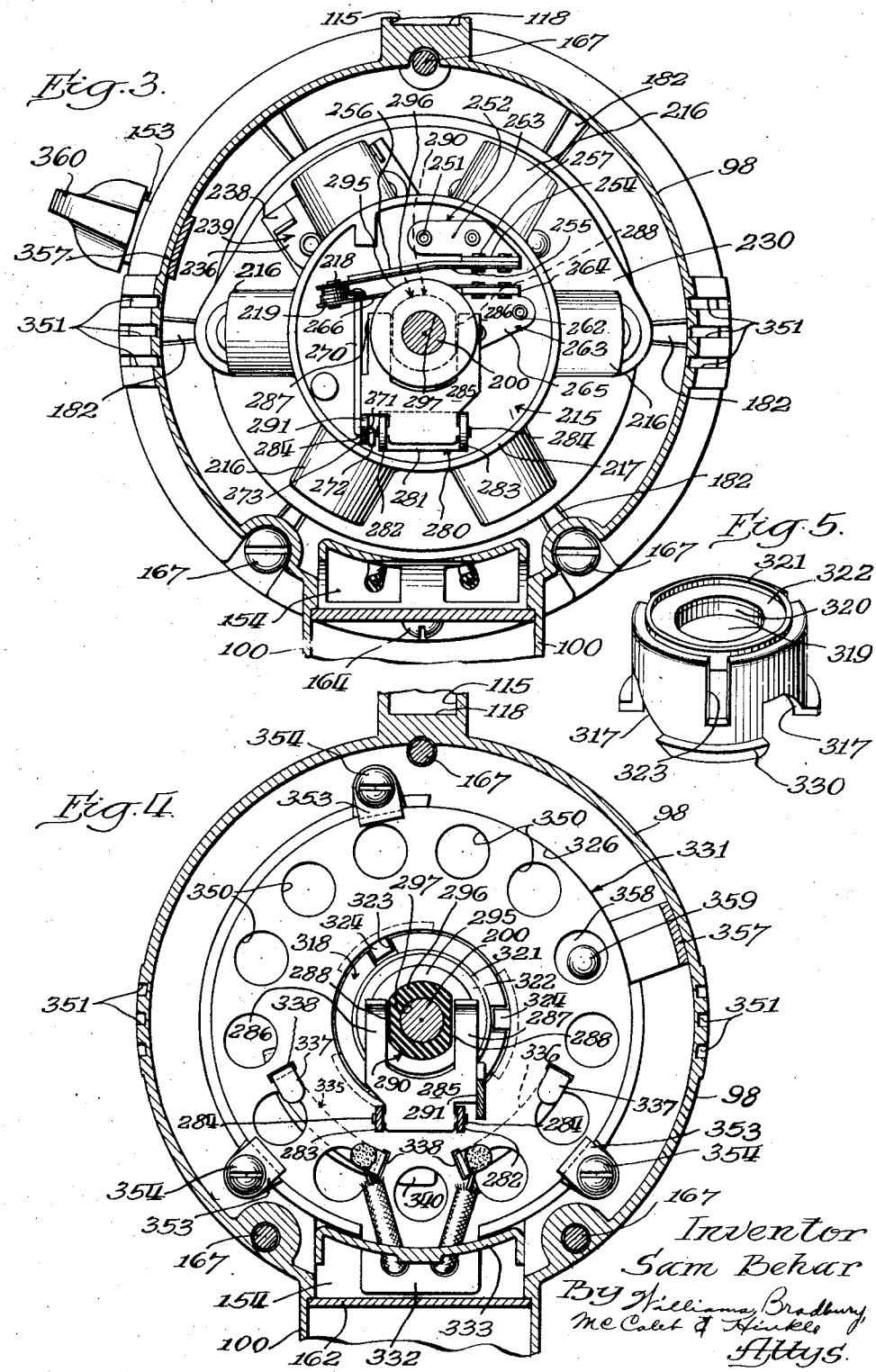

Nov. 18, 1941.  S. BEHAR  2,262,912
ELECTRIC FOOD MIXER
Filed Oct. 6, 1938  11 Sheets-Sheet 4

Inventor
Sam Behar
By Williams, Bradbury,
McCaleb & Hinkle
Attys.

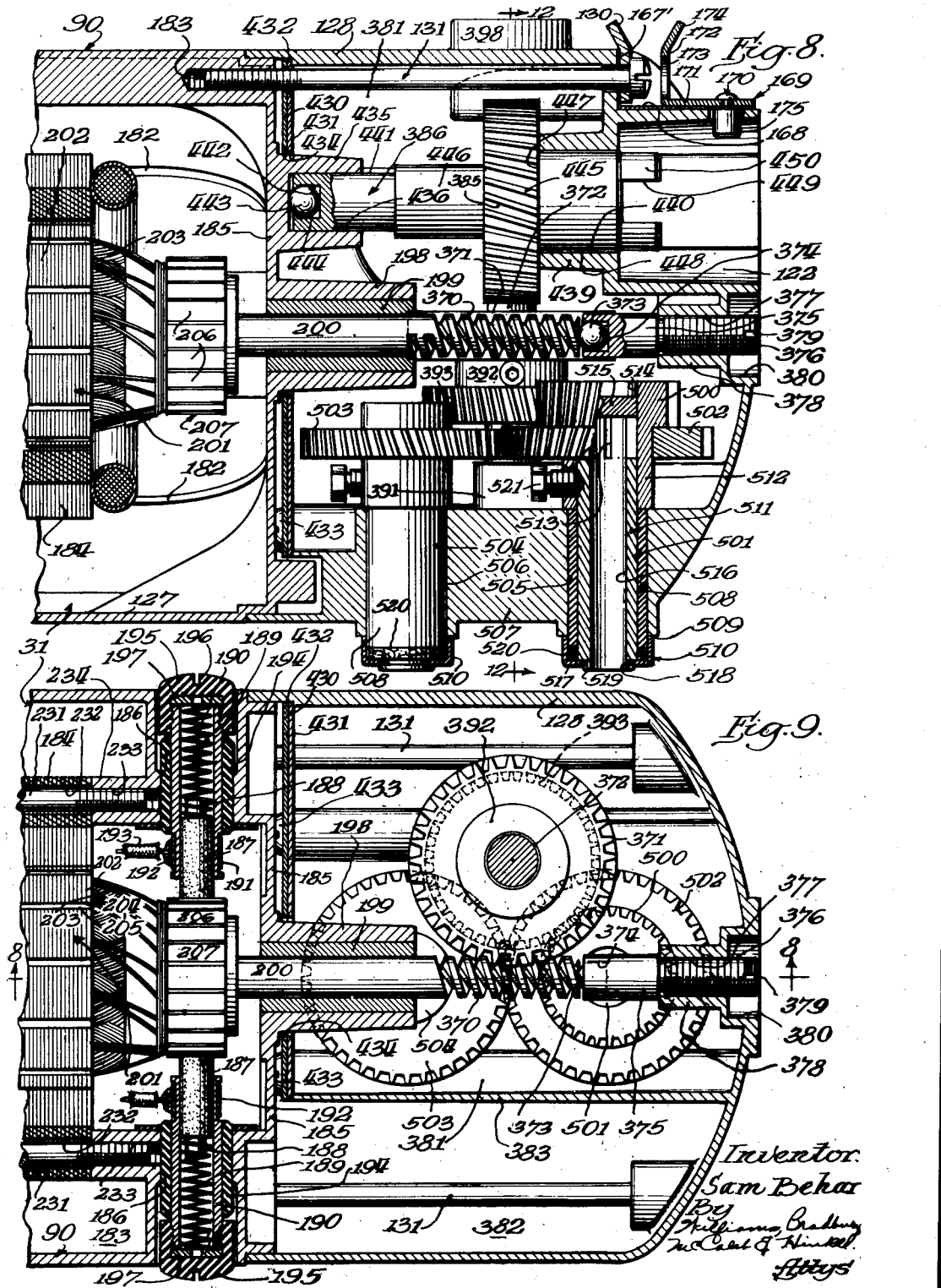

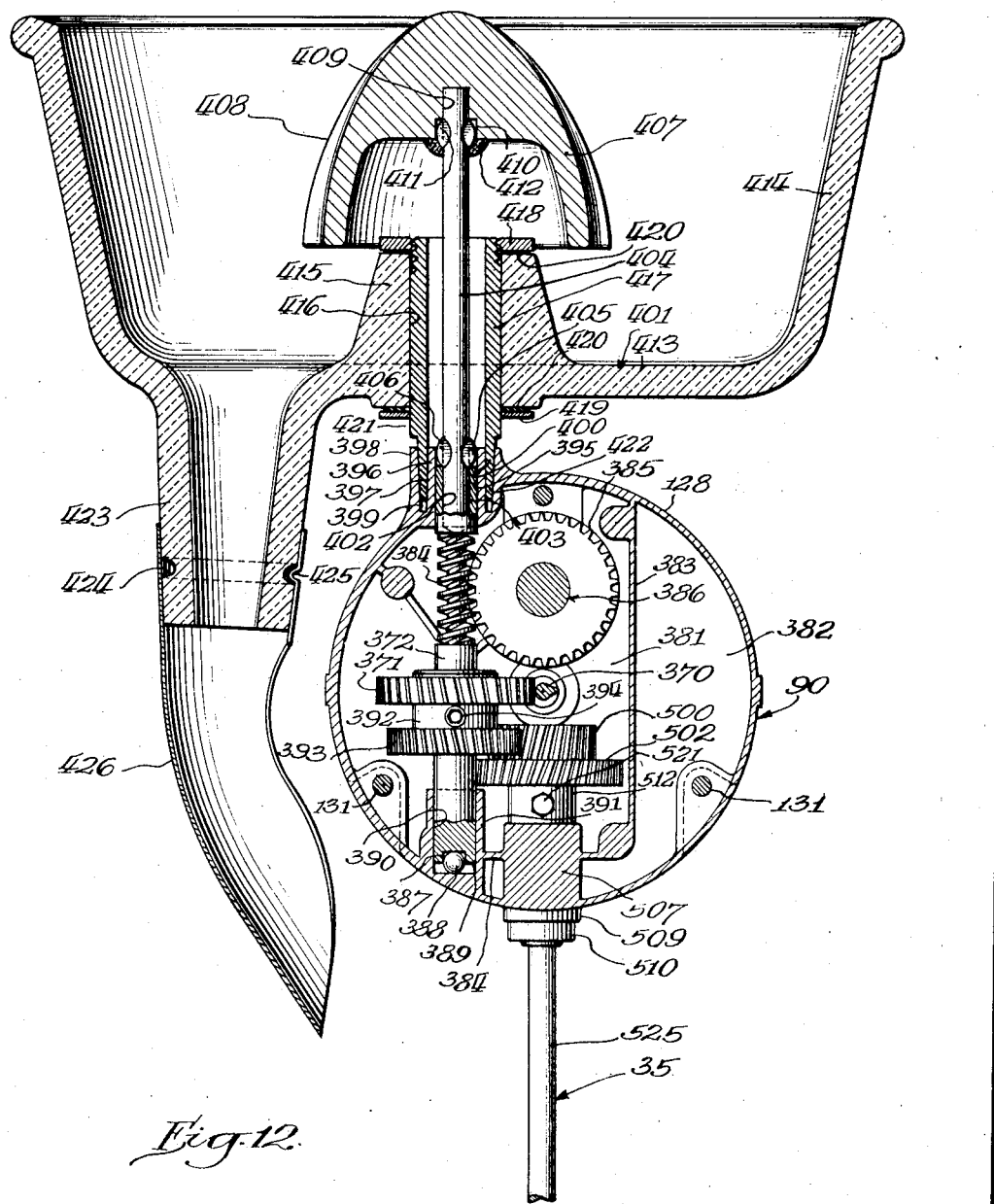

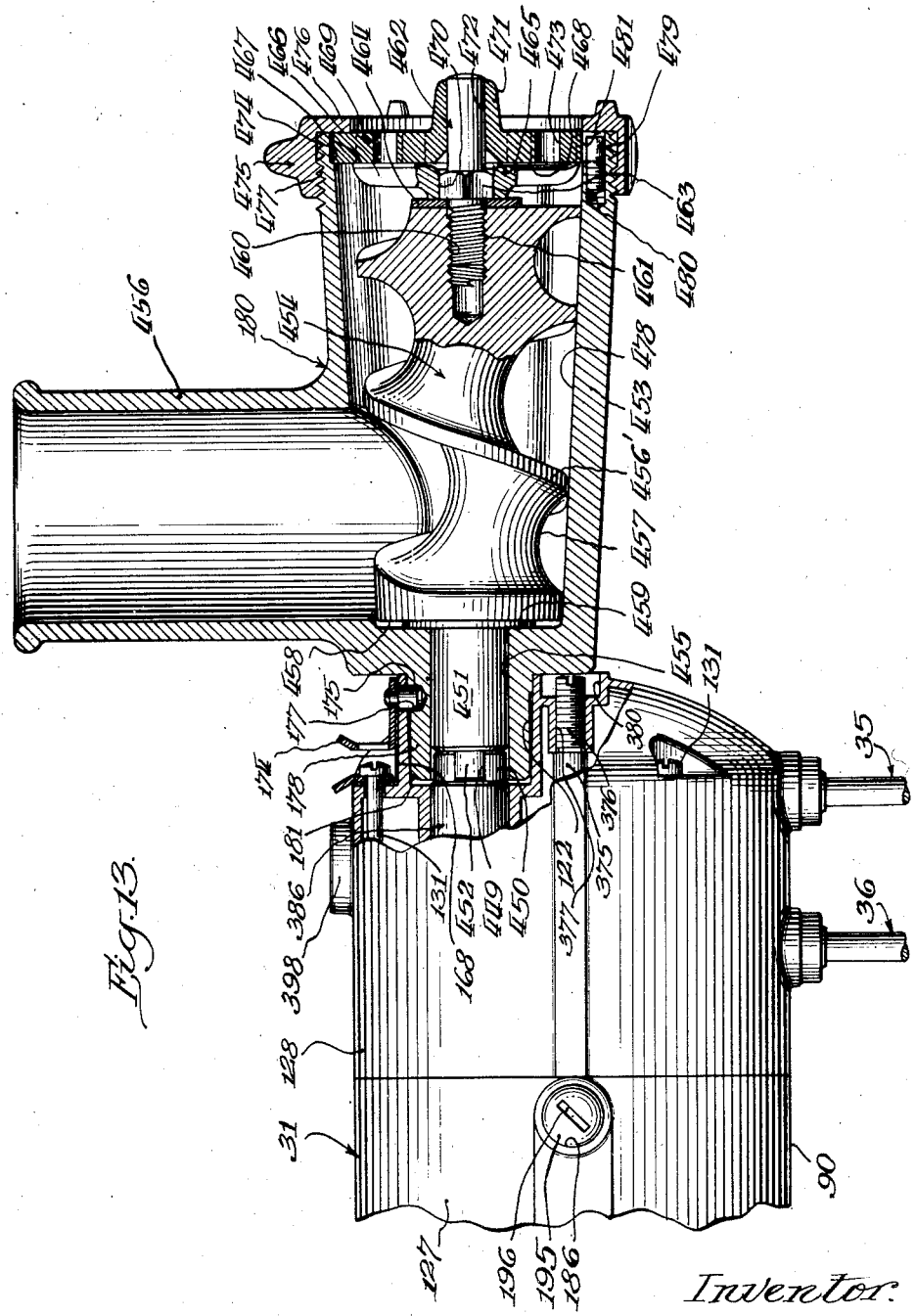

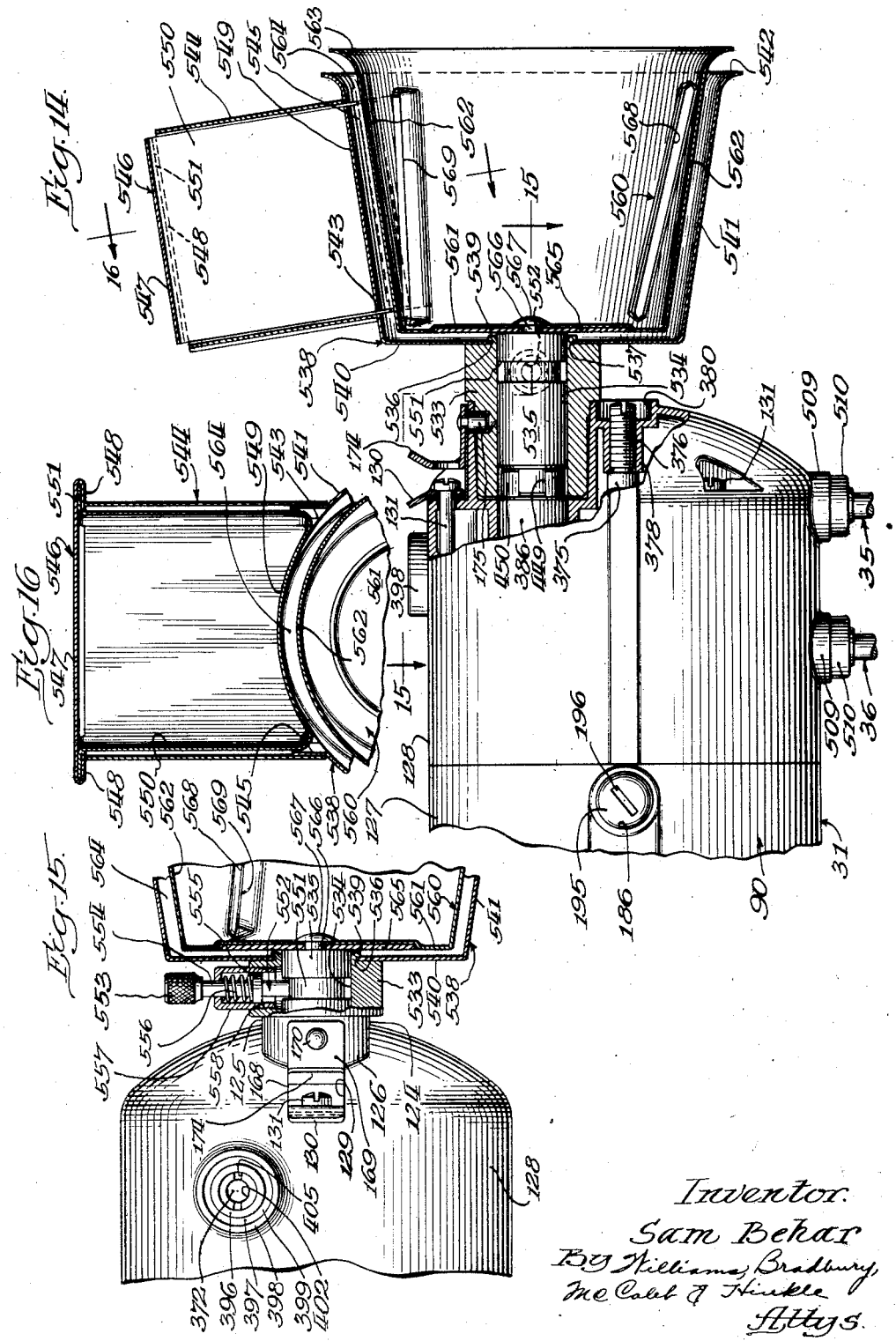

Nov. 18, 1941.   S. BEHAR   2,262,912
ELECTRIC FOOD MIXER
Filed Oct. 6, 1938   11 Sheets-Sheet 9
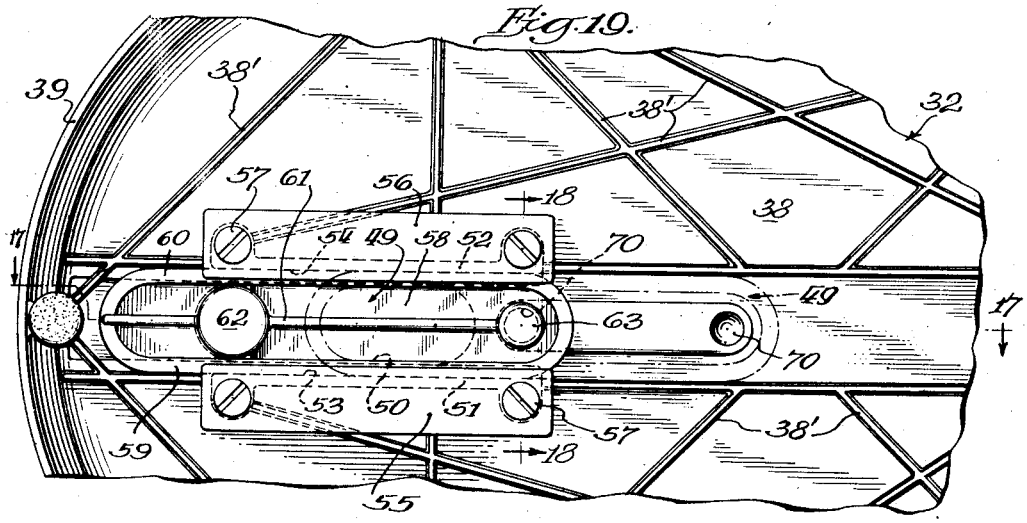
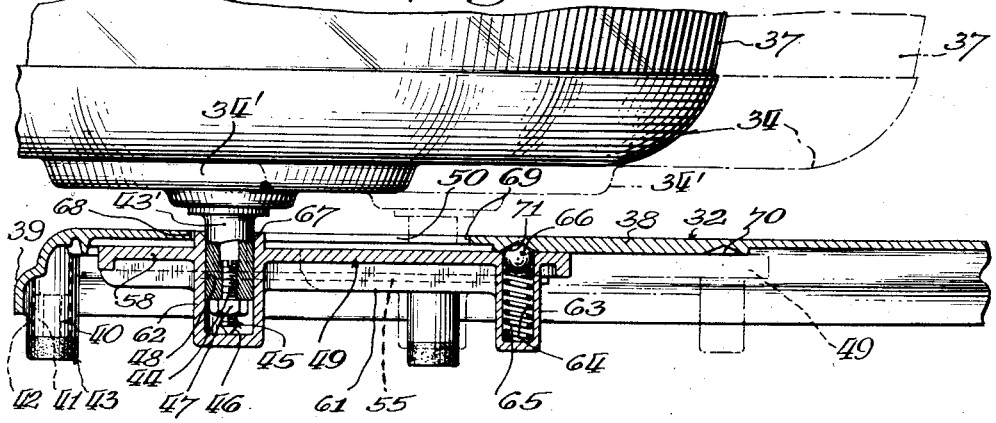
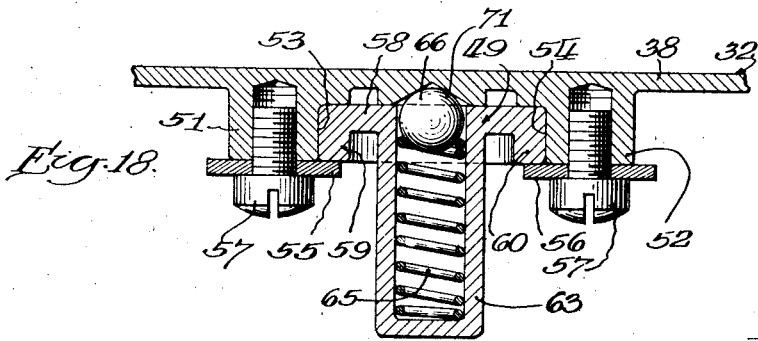
Inventor
Sam Behar
By Williams, Bradbury,
McCaleb & Hinkle
Attys.

Nov. 18, 1941.  S. BEHAR  2,262,912
ELECTRIC FOOD MIXER
Filed Oct. 6, 1938    11 Sheets-Sheet 10
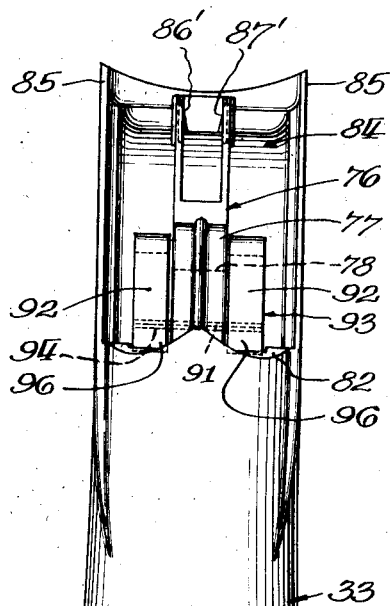
Fig. 20.
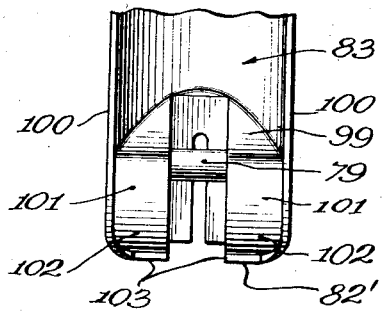
Fig. 22.
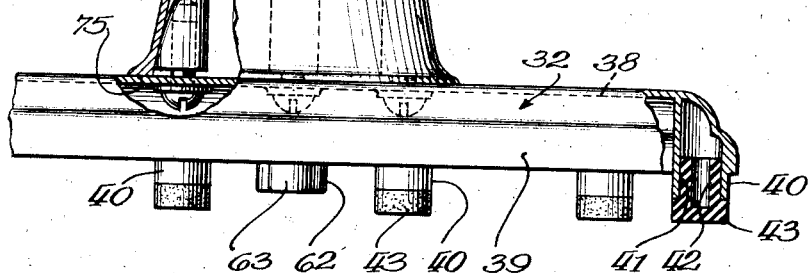
Fig. 21.
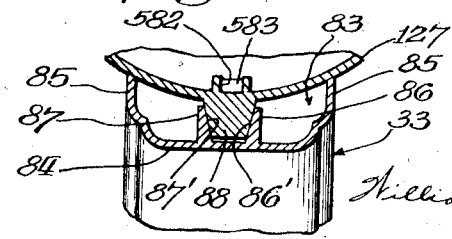
Inventor
Sam Behar
By Williams, Bradbury, McCaleb & Hinkle
Attys.

Nov. 18, 1941.　　　　S. BEHAR　　　　2,262,912
ELECTRIC FOOD MIXER
Filed Oct. 6, 1938　　　　11 Sheets-Sheet 11

Inventor
Sam Behar
By Williams, Bradbury, McCaleb & Hinkle
Attys.

UNITED STATES PATENT OFFICE 2,262,912

ELECTRIC FOOD MIXER

Sam Behar, Chicago, Ill., assignor to A. F. Dormeyer Mfg. Co., Chicago, Ill., a corporation of Illinois Application October 6, 1938, Serial No. 233,541

36 Claims. (Cl. 172—36)

The present invention relates to food mixers, and is particularly concerned with electric food mixers of the household type which are also adapted to drive a multiplicity of other food working attachments.

Certain of the food mixers of the prior art have been provided with separable gear housings for the purpose of driving food-working attachments that require different speed from that of the mixers or beaters.

One of the objects of the invention is the provision of an improved food mixer having all of its driving mechanism built in the main housing so that it is unnecessary to provide separate gear housings and so that the various food-working attachments may be applied to the driving unit with greater facility and in the shortest possible time.

Another object of the invention is the provision of an improved electric driving unit for food-working devices, in which the attachment of the various food-working devices has been so simplified that the attachments may be applied very quickly by one unskilled in mechanical devices, and may also be removed with a minimum amount of effort, and without necessity for technical knowledge.

Another object of the invention is the provision of an improved electric driving unit for food-working devices, in which the various driving shafts are adapted to be driven at the best speed for the work to which they are applied, so that it is unnecessary to use any detachable speed-reducing gear arrangements.

Another object of the invention is the provision of an improved food mixer construction of the type having a turntable for supporting the bowl, in which the bearing for the turntable is slidably mounted, so that it may be moved into various different positions which are appropriate for bowls of different sizes.

Another object of the invention is the provision of an improved food mixer driving unit comprising an electric motor and an improved handle structure which is adapted to cover the drive shaft opening that is used for other attachments, and in which the handle is quickly detachable and automatically locked in place when it is moved into proper position on the motor housing.

Another object of the invention is the provision of an improved food mixer having additional attachments, which is provided with automatic means for locking these attachments in place, so that it is only necessary to move the attachment into its proper position, where it will be automatically locked for operation.

Another object of the invention is the provision of an improved electric food mixer in which the driving unit is adapted to be tilted to remove the beaters from the bowl, for removal of the bowl, but in which the motor is adapted to be held at a position above the bowl, by means of a spring arrangement, so that the motor need not be mounted midway of its ends to pivot past its center of gravity, but it may be mounted at its end, and the device may be supported upon a smaller base and made more stable, due to the retention of the motor on the same side of its center of gravity, with respect to its pivotal point on the standard.

Another object of the invention is the provision of an improved standard arrangement for holding the motor unit in working position or in a position above the bowl, for removal of the bowl, which also permits the removal of the motor or driving unit from its support by the handle for operations away from the supporting standard, and in which the standard is provided with an aligning means whereby the motor is accurately aligned and firmly supported when it is placed upon the standard.

Another object of the invention is the provision of an improved governor construction by means of which the electric driving unit is kept at the proper speed for operation of various attachments, irrespective of the amount of load that is placed upon it, and by means of which the driving unit is adapted to develop greater power than the devices of the prior art.

Other objects and advantages of the invention will be apparent from the following description and the accompanying drawings, in which similar characters of reference indicate similar parts throughout the several views.

Referring to the eleven sheets of drawings accompanying the specification:

Fig. 1 is a side elevational view of an electric food mixer of the household type embodying the invention, with the mixer in the mixing position on the standard;

Fig. 2 is a vertical sectional view, taken on a plane passing through the axis of the motor drive shaft, showing the details of construction of the driving unit for the food mixer;

Fig. 3 is a vertical sectional view, taken on the plane of the line 3—3 of Fig. 2, looking in the direction of the arrows, showing certain details of construction of the motor and its governor switch;

Fig. 4 is another vertical sectional view, taken on the plane of the line 4—4 of Fig. 2, looking in the direction of the arrows, showing other details of construction of the governor;

Fig. 5 is a view in perspective of a speed adjustment collar or cam, which forms a part of the governor;

Fig. 8 is an enlarged fragmentary sectional view, taken on a vertical plane passing through the axis of the motor shaft, with the various shafts and gears in elevation, showing the details of construction of the forward end of the driving unit and its gear housing;

Fig. 9 is a similar fragmentary sectional view taken on a horizontal plane, on the plane of the line 9—9 of Fig. 2;

Fig. 10 is a fragmentary vertical sectional view, taken through the vertical axis of the standard, showing the mode of pivotal attachment of the motor unit on the supporting standard, with the motor in the backwardly tilted position that is used when the bowl is to be removed;

Fig. 11 is a view similar to Fig. 10, showing the parts in the position which they assume when the beaters are in mixing position in the bowl;

Fig. 12 is a vertical sectional view, taken on the plane of the line 12—12 of Fig. 8, through the driving unit, with the citrus fruit juicer applied to the driving unit;

Fig. 13 is a fragmentary vertical sectional view, taken on a plane which passes through the axis of the food grinder, showing the forward end of the motor driving unit, and a food grinder or chopper attached thereto;

Fig. 14 is a view similar to Fig. 13, with a slicer or shredder attachment applied to the motor driving unit;

Fig. 15 is a fragmentary sectional view, taken on a horizontal plane, on the plane of the line 15—15 of Fig. 14, looking in the direction of the arrows, showing the mode of attachment of the driven member of a slicer or shredder in the slicer or shredder housing;

Fig. 16 is a vertical sectional fragmentary view, taken on the plane 16—16 of Fig. 14;

Fig. 17 is a fragmentary vertical sectional view of the base, including the turntable, in elevation, and further illustrating this arrangement for the turntable bearing;

Fig. 18 is a fragmentary vertical sectional view, taken on the plane of the line 18—18 of Fig. 19, looking in the direction of the arrows, showing the mode of retaining the turntable bearing in certain predetermined positions;

Fig. 19 is a bottom plan view of the supporting base for the food mixer, showing the details of construction of the base and a sliding arrangement for the turntable bearing, by means of which the turntable bearing may be moved to various positions for bowls of different size;

Fig. 20 is a fragmentary sectional view, showing a rear elevation of the top of the standard, with the motor removed;

Fig. 21 is a fragmentary sectional view, taken on the plane of Fig. 2, showing the aligning arrangement for the motor and standard;

Fig. 22 is a fragmentary front elevational view of the end of the motor supporting column;

Figure 6:
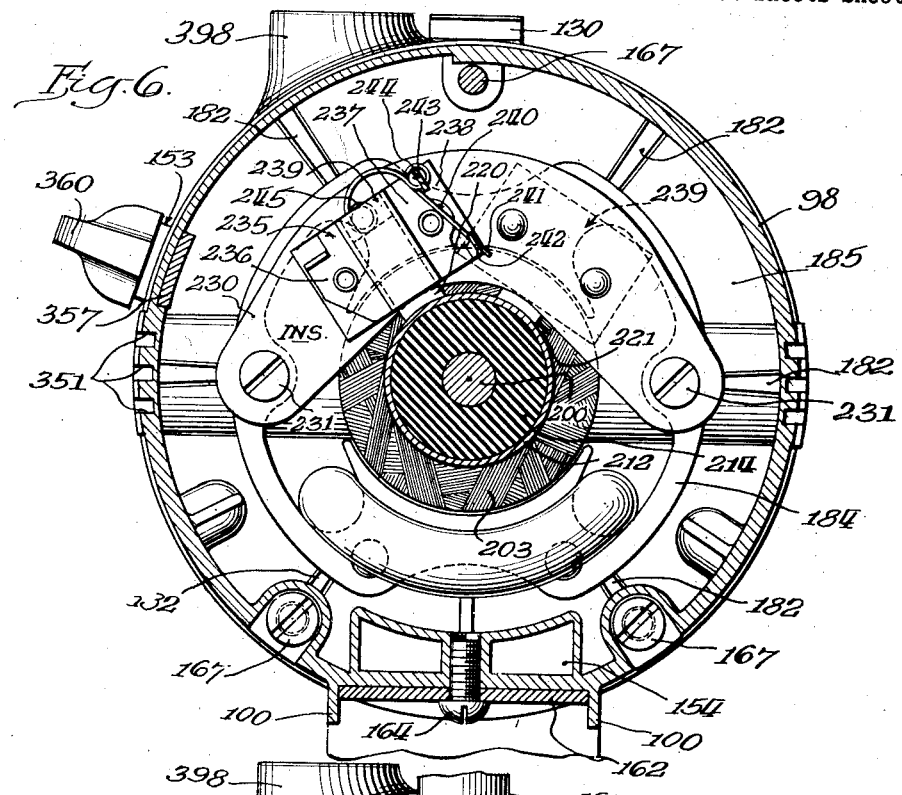
Fig. 6 is another vertical sectional view, taken on the plane of the line 6—6 of Fig. 2, showing certain details of construction of the motor.

Referring to Fig. 1, the electric food mixer, which is indicated in its entirety by the numeral 30, preferably comprises an electric motor driving unit 31, a base 32 having a standard 33, turntable 34, beater elements 35, 36, and bowl 37.

The base 32 and standard 33 may be constructed of two separate cast metal pieces, the standard 33 being hollow and secured to the base by a plurality of screws passing through the base and threaded into the standard 33.

The base 32 comprises a cast metal member having a top flange 38 and a depending border flange 39, the latter being provided with a multiplicity of downwardly extending lugs 40, which form legs for the base, and which are provided with internal bores 41 for receiving the reduced cylindrical portion 42 of a rubber foot 43. The area of the base 32 is such that it is adapted to support bowls of any size which are likely to be used, and so that the motor unit 31 is stably supported at all times, and particularly when other attachments are applied to the driving unit. Thus the base 32 extends laterally beyond the end of the driving unit 31, as shown in Fig. 1, and also at both sides of the driving unit 31.

Besides the depending border flange 39, it may have a multiplicity of transversely and backwardly extending reinforcing flanges 38' underneath the top flange 38. The bowl 37 may be of any convenient size, and is preferably of such shape that the beaters 35, 36 may gain access to all parts of the ingredients in the bowl 37.

The bowl 37 has its bottom shaped to fit the cavity in the pressed sheet metal turntable 34, which may also have a second depression 34' formed therein for receiving the base of a smaller bowl. The turntable trunnion 43' may comprise a metal stand, which is riveted into the center of the turntable 34 and provided at its bottom with a threaded bore 44 for receiving a threaded bolt 45, having a conical end 46.

A lock nut 47 holds the bolt 45 in predetermined position so that the adjusted position of the bolt 45 determines the elevation of the turntable 34 and bowl 37 with respect to the beater elements 35, 36. Thus the elevation of the turntable may be adjusted so the beater elements extend into the very bottom of the bowl, but are out of contact with the bowl.

The trunnion 43' is adapted to slidably and rotatably engage in a cylindrical bore 48 of a carriage 49, also formed of cast metal, and slidably mounted on the base 32. In order that the turntable trunnion 43 may extend into its bearing 48 in carriage 49, the base is provided with a longitudinally extending slot 50 of sufficient width to clear the trunnion 43, and extending in the direction of the axis of the driving motor 31 on the base 32.

The bottom of the base 32 is provided with a pair of depending guide ribs 51, 52, which are provided with flat and parallel guiding surfaces 53, 54, opposite each other, for engaging the complementary flat side surfaces of the carriage 49.

A pair of metal plates 55, 56 are secured by means of screw bolts 57 to the ribs 51, 52, the screw bolts being threaded into the ribs, and the plates 55, 56 extending over under the carriage 49, to retain it between the guide members 51 and 52.

The carriage 49 comprises a cast metal member which is formed with a flat upper body flange 58 and a pair of depending parallel border flanges 59, 60. It is also provided with a depending reinforcing rib 61 and with depending lug 62, having the bore 48, previously described, which serves as a bearing for the turntable trunnion 43'.

At its right end (Fig. 17) the carriage 49 is provided with another depending lug 63, having a cylindrical bore 64, which is open at the top and which contains a helical spring 65, the end of which engages a ball 66.

The turntable bearing socket 48 is bordered at the top by an upwardly extending cylindrical flange 67, which extends into the slot 50 of the base 32 and which limits the movement of the carriage 49, as the cylindrical flange 67 is adapted to engage the ends 68 of the slot 50.

The top flange 38 of base 32 is formed with a pair of depressions 70, 71, located to receive the ball 66, and the depressions 70, 71 are preferably partially spherical or conical, or provided with tapered walls so that the ball 66 may be cammed downward when the carriage 49 is moved laterally in its guides.

Similarly, when the carriage reaches either of its positions which correspond to the depressions 70, 71, the ball 66 is adapted to snap into the position 70 or 71 and retain the carriage in that position. It is possible, of course, to utilize the mixer with the carriage 49 in any of the intermediate positions, but the most frequently used positions are those at the limits of movement of the carriage 49, one of which is for the large bowl and the other of which is for a small bowl.

The proportions of the bowl and location of the beaters 35, 36 and carriage 49 are such that when the ball 66 is engaged in depression 71 the bowl is suitably located, as shown in Fig. 1, for mixture of the ingredients in the bowl by the beaters 35, 36.

The bowl 37 may then be turned by hand in order to bring all parts of the mixture into engagement with the beating elements 35, 36, or the beating elements 35, 36 being arranged on a radius of the bowl 37, they may, if the mixture is stiff enough, cause a reaction through the mixture to the bowl which will cause the bowl to rotate when the beaters are rotated.

When the ball 66 is in the depression 70, the carriage 49 and turntable 34 is suitably located so that if a small bowl has its base in the depression 34' of the turntable, it will be suitably located about the beating elements 35, 36.

In this case, however, the beating elements work substantially the full cross-sectional area of the bowl and may be located centrally of the small bowl. Various intermediate sizes of bowls may be used, and by means of the present arrangement larger bowls may be used than with any of the devices of the prior art, as the present motor driving unit is pivoted at its end and overhangs the bowl by a greater amount than the devices of the prior art.

The column or standard 33 comprises a hollow, cast metal member, having a flat bottom edge 75, which engages the top flange 38 of the base 32, to which it is secured by screw bolts, as previously described.

The column 33 tapers toward the top, and by virtue of its enlarged bottom area provides a firmer engagement between the column and base. At its upper end it is provided with an inwardly extending body 76, which is formed with an upwardly extending hook formation 77 surrounding a partially cylindrical groove 78.

The groove 78 is adapted to receive the pivot pin 79 of the motor unit, and there is a sufficient clearance at 80 between the end of the hook 77 and the surface 81 of the lug 76, so that the pin 79 may be removed from its groove 78 by an upward movement when the motor is in the proper position.

The standard also has (Fig. 10) an inwardly extending, partially cylindrical flange 82, located immediately below the motor, and curved on a radius which corresponds to the axis of the pin 79.

The flange 82 closes the upper end of the standard at the pivotal support of the motor and may slidably engage the complementary cylindrical curved surface 82' on the lower end of the motor-supporting bracket 83.

The standard is also provided with a forwardly extending arm 84, forming an integral part of the standard, and bordered by the upwardly extending border flange 85 on each side. The arm 84 is also reinforced by a pair of symmetrically located reinforcing ribs 86, 87, which terminate in the lug 76, which bears the hook 77. The reinforcing ribs 86, 87 are spaced from each other and are provided with the tapered camming surfaces 86', 87' for engaging a complementary lug 88 carried by the motor housing 90 (Fig. 2) for the purpose of effecting the positive alignment of the motor with the standard arm 84 when the motor is in mixing position.

The standard is also provided with a flat seating surface 91 at the juncture of the arm 84, and the main standard body 33, for supporting a retaining spring 92, which is provided with a pair of retaining arms 93 and an attaching flange 94. The attaching flange is secured to the surface 91 by means of a screw bolt 95 which is threaded into a threaded bore in the standard, and the spring is preferably provided with a pair of upwardly extending arms 93 carried by hairpin bends 96, one arm being located on each side of the pair of reinforcing flanges 86, 87.

The motor housing 90 has its rear cover member 98 provided with a depending supporting bracket 83, which comprises a rear yoke 99, and a pair of forwardly extending flanges 100.

The flanges 100 and yoke 99 carry at their lower ends a pair of inwardly extending lugs 101 to provide the supporting bracket 83 with sufficient body for carrying the pivot pin 79. The lugs 101 are provided with registering bores for receiving the pivot pin 79, which comprises a cylindrical metal member having a slightly enlarged and knurled surface at one end, so that when it is driven into the bores it is fixedly secured in the supporting bracket 83.

The lugs 101 on the supporting bracket 83 of the motor are spaced sufficiently to receive between them the lug 76 and hook 77 carried by the standard 33. The lugs 101 are provided at their left side (Fig. 11) with the camming surface 102, adapted to engage the tilt-back spring 92. The cam surface 102 engages the spring arm 93 when the parts are in the position of Fig.

10, and forces the spring arm 93 backward until the point of longest radius of the cam 102 passes the line of centers between the supporting bracket 94 of the spring and the pivot pin 79.

At this time a depending stop lug 103 on the motor bracket 83 engages a shoulder 104 on the standard, preventing further backward tilting of the motor, and at this time the motor has been lifted sufficiently so that the beater elements 35 and 36 are above the bowl, so that the bowl 37 can be removed.

The motor 31 does not tilt back far enough to move its center of gravity from the overhanging position of Fig. 1 to a backward position, but the motor is held in the elevated position of Fig. 10 by means of the spring 92.

The tilt-back spring 92 is preferably stiffened by means of an auxiliary stiffening spring 105, having an upwardly extending stiffening arm 106.

The side flanges 100 of the motor-supporting bracket 83 are spaced from each other sufficiently so that they fit between the upwardly extending border flanges 85 on the forwardly extending arm 84 of the standard 33. Thus, when the motor is in the mixing position of Fig. 1, all of the details of construction and mechanism relating to the motor support between the motor and standard are enclosed in the housing which comprises the arm 84, flanges 85, and parts 99, 100.

The motor is firmly supported on the standard and base, but may be very conveniently removed by merely tilting the motor back and lifting its pivot pin 79 out of the groove 78. When the bowl is to be removed, the motor need only be tilted backward, where it will be held by the retaining spring 92, and the beating elements are then in position so that any drippage drips back into the bowl 37.

Due to the support of the motor 31 at its rear end, a much larger overhang is provided, and larger bowls may be used with any of the devices of the prior art.

The motor housing 90 is preferably provided with a handle 110, which is preferably constructed of insulating material, such as a molded phenolic condensation compound, and the handle is preferably removable so that it will not interfere with the operation of such attachments as are placed at the points where the handle is attached.

The handle 110 is preferably hollow, being formed of a pair of side flanges 111, 112, joined by an upper yoke 113, and it may taper in size toward the rear end, where it is provided with a pointed end 114. The pointed end 114 is adapted to be received in a complementary socket 115, the open end 116 of which extends forward with respect to the motor housing 90.

The pointed end 114 has a flat lower surface 117, engaging a complementary flat surface 118 on the motor housing 90 so that when this end of the handle and the socket 115 are in engagement with each other, the handle is supported against rotation at this end.

At its forward end the handle 110 has a downwardly extending portion 119, which is provided with a latch 120 for securing the handle to the housing 90. The downwardly extending portion 119 has an extension shield 121, which serves to cover a power take-off opening 122, which is intended to be used when a food chopper or grinder is attached to the driving unit 31.

This power take-off opening is adapted to cooperate with a pair of inwardly extending lugs 123 carried by the shield 121 so that the lugs 123 are engaged in the aperture 122 when the handle 110 is secured to the motor housing 90.

The opening 122 also extends in a forward direction so that with one movement the handle 110 may have its pointed end 114 inserted in the socket 115 and its lugs 123 inserted in the opening 122.

The side flanges 111, 112 on each side of the lugs 123 also engage the flat surfaces 124, 125 on each side of a forwardly extending lug 126 on the motor housing 90 (Fig. 15) so that the handle 110 is thus prevented from rotating in a lateral direction on the housing 90 at its front end, when it is in latched position.

The motor housing 90 preferably comprises three main parts, the rear cover 98, the intermediate body portion 127, and the front cover portion 128. The front cover portion 128 is formed at its upper front end above the power take-off socket 122, with an annular depression (Fig. 2) 129 for receiving the latching keeper and other parts.

The latching keeper may consist of a metal plate 130, having its lower end secured to the cover 128 by motor screw bolt 131. Its upper end is backwardly bent at a slight angle, thereby providing a latching shoulder at 132, which is engaged by a hook-shaped end 133 of the handle latch 120.

The handle latch 120 may comprise a cast metal member, having an elongated actuating portion 134, the rounded end surface 135 of which is preferably knurled in a cross-wise direction, for engagement with the thumb. The actuating end 134 of the latch 120 projects through an aperture 145 in the yoke 113 of the handle, and the upper end of the aperture 145 serves as a stop surface when the latch 120 is not engaging its keeper 132.

It is provided with an enlarged bearing portion 136, having a bore 137 for receiving the latch pivot pin 138. The side flanges 111, 112 of the handle preferably have reinforcing portions 139, adjacent the pivot pin 138, and have bores for receiving the pivot pin 138, which is retained in the bores by frictional engagement of a knurled portion of the pivot pin 138, with one of the bores 137.

The spring 140 has a U-shaped portion 141 which engages under the handle 120 and has its two legs curved about the pivot pin 138 and extended upward into engagement with the inside of the handle at the point 142. Thus the latch spring 140 urges the outer end of the latch 120 upward into latching position.

It may be unlatched by pushing downward with the thumb at the point 135. The function of the latch 120 is to hold the handle 110 in its position of Fig. 2. When the handle is held in this position by the latch 120, the handle supports the motor housing 90, by virtue of the engagement of the handle in the sockets 115 and 122, so that the strain of support of the motor is borne by other handle parts than the latch, which merely serves to retain the handle in its supporting position.

It is found that the present handle structure may be attached and detached very quickly and with a minimum amount of effort, and that it is remarkably well suited to manipulation by those unskilled in mechanical devices.

The motor driving unit is enclosed in a housing 90, which preferably comprises the three parts 98, 127, and 128, and all of these housing parts are preferably constructed of cast metal. The housing is substantially cylindrical in form, provided with rounded ends, and it is joined to the standard in such manner that the complete unit is streamlined.

The rear cover member 98 is adapted to house the controlling switch structure, the rear armature shaft bearings, and the speed controlling governor. The middle housing or body portion 90 is adapted to house the main motor structure, such as the field and armature, and to support the brushes for the commutator. The front structure or gear housing 128 is adapted to house the front armature shaft bearings, the gears, and the various driven shafts, which actuate the beater elements 35, 36, and other food attachments.

Thus the rear cover member 98 is substantially hemi-spherical in shape, but slightly pointed, and it is hollow and provided with a reduced cylindrical portion 150, which is adapted to be received within a flange 151 carried by the middle body section 90.

Figure 7:
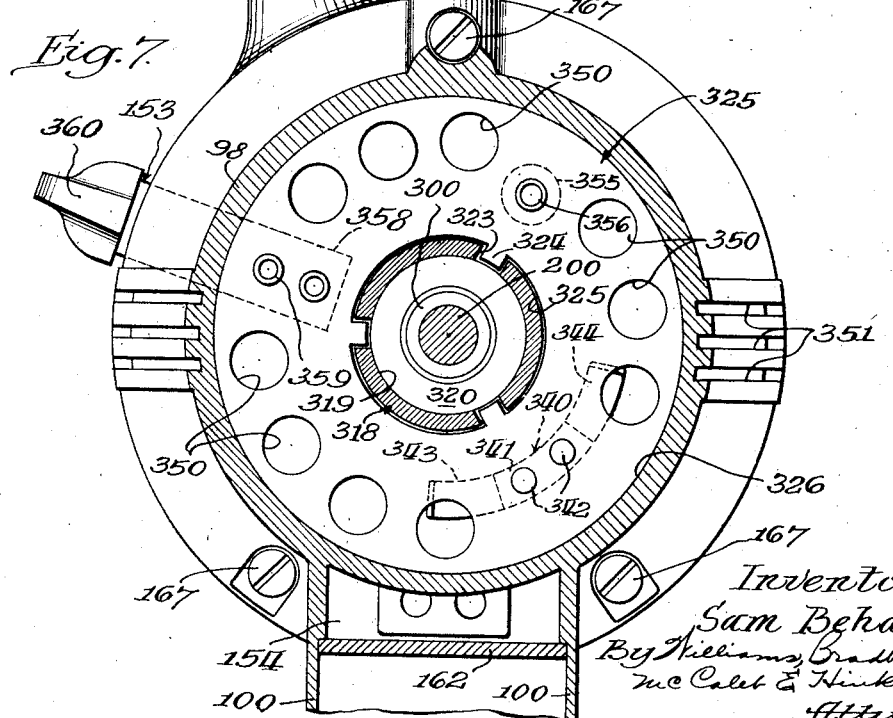
Fig. 7 is another vertical sectional view, taken on the plane of the line 7—7 of Fig. 2, looking in the direction of the arrows, showing certain details of construction of the shut-off switch and speed adjusting plate, which is adapted to actuate the collar of Fig. 5.
Figure 24:
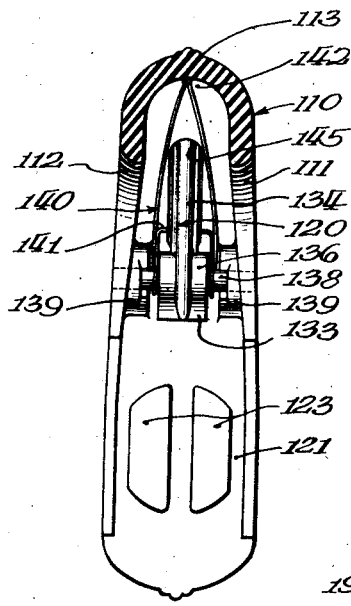
Fig. 24 is an inside elevational view of the front end of the handle, with the horizontal part of the handle in section.
Figure 23:
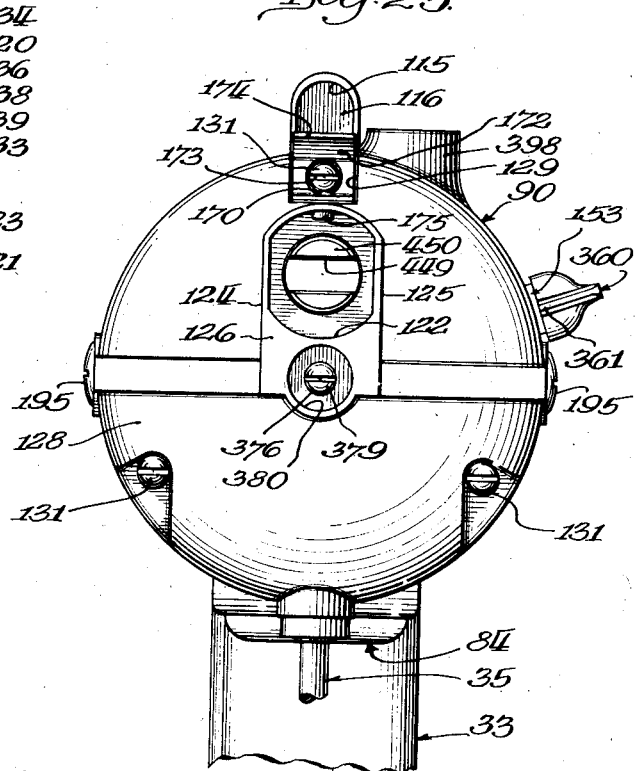
Fig. 23 is a fragmentary front elevation of the motor unit with handle removed.

The reduced cylindrical flange 150 is cut away at 152 over an arc of about 90 degrees, to form a slot 152 for passing the switch-actuating arm 153 (Fig. 7). In order to enclose and protect the conductors, the rear cover member 98 may be cast with an arcuate conduit 154 at its lower side for receiving the conductors 155, 156, which form a part of the rubber cover insulating cable 157.

The cable emerges from the rear housing member 98 through a bore 158, protected by a rubber bushing 159, and is anchored by means of a ring of wire 160, which is clamped about the rubber cable 157, inside the housing. The rear housing member 98 also has a lower wall 161, which, with a cover plate 162, forms a connection box 163 for housing the soldered connections between the conductors of the cable 157 and the insulated wires in the housing.

The plate 162 is secured in place by a screw bolt 164 and has the area of the plate 162 such that it fits within the side flanges 100 of the motor-supporting bracket 83, the single screw 164 being adapted to hold it in place.

The middle housing member 127 comprises a cast metal member of cylindrical form, the rear end of which is provided with the cylindrical flange 151, adapted to embrace the flange 150 of the rear housing member 98.

The front end of the middle housing 127 is provided with a part 165 of reduced cylindrical shape for receiving the flange 166 of the gear housing 128. A plurality of screw bolts 167 pass through the rear housing 98 and are threaded into threaded bores in the middle housing 127. Similar screw bolts 131 extend through the gear housing 128, and are threaded into the middle housing 127. One of these screw bolts is particularly adapted to support the keeper 130 (Fig. 2) for the handle latch 120, and to carry a latching member for supporting various attachments.

The cover has already been described in connection with the handle. In addition to the keeper 130, there is secured beneath the head of the bolt 131 the upwardly extending flange 167' of a spring which has an aperture for the bolt 131.

The spring 168 has a horizontal flange and corresponds to the angular shape of the recess 129, and the flange supports an angular latching member 169, by means of a rivet 170. The angular latching member 169 has a horizontal flange 171 and a vertical flange 172.

The vertical flange 172 has an aperture 173 and a forwardly bent end portion 174. The rivet 170 has an elongated head 175, which is stud-like in shape and adapted to extend into an aperture 176 to aid in the alignment of these latching members so that they may be secured by a single screw. The aperture 173 permits access to the head of screw 131, although these two members 169 and 130 are secured together when they are installed.

The stud 175 projects through the aperture 170 into the power drive socket 122, and referring to Fig. 13 it will be observed that the stud 175 is adapted to project into a socket 177 in the supporting hub 178 of a food chopper 180, further to be described.

The stud 175 may be withdrawn by pressing backward on the upwardly extending flange 174 with the thumb. As the hub 178 is provided with a rounded camming surface 181 at its left end (Fig. 13), the food chopping attachment may be inserted in the power drive socket 122 by merely pushing it in, whereby the camming surface 181 will itself cause retraction of the stud 175 until the hub 178 is fully housed in the socket 122, whereupon the stud 175 will snap into the socket 177.

The middle housing member 127 is provided with a plurality of inwardly extending reinforcing ribs 182, which are each widened to provide enough body in the housing for threaded bores 183, which receive the screw bolts 167 or 131.

The ribs are extended further inward of the housing 127 for the purpose of engaging the motor field core 184 (Fig. 9), which may be constructed of soft iron laminations riveted together, and of conventional form. The middle housing member 127 is also provided at its left end (Fig. 2) with partition wall 185, which is adapted to provide support for a plurality of bearings, and is also formed with suitable radially extending bores 186 for supporting the commutator brushes 187.

The commutator brushes may be of carbon material and cylindrical in shape and provided with reduced cylindrical portions 188 for receiving the end of the brush coil spring 189, which is housed in a brass tube 190.

The brass tube 190 has a cylindrical bore for slidably receiving the brushes 187, and at its inner end it has a groove 191 for receiving the resilient clamping connector 192 carried by conductor 193 to effect a connection between the brushes and other parts of the motor.

The metal sleeve 190 is carried by an insulating bushing 194, which is frictionally mounted in the bore 186, and it is capped by means of a molded insulating cap 195, having a slot 196 for a screw driver, and having a metal washer 197 for engaging the end of the coil spring 189.

The partition 185 is formed with an elongated bearing sleeve 198, which is adapted to receive the bushing or bearing 199 for the armature shaft 200, thus giving the shaft 200 an elongated bearing surface.

The armature shaft 200 carries an armature 201 of conventional design, formed with an armature core 202 of soft iron laminations, with suitable windings 203 disposed in slots 204, and secured in place by insulating wedges 205.

The various windings are connected in the usual manner to the segments 206 of a commutator 207, the motor being of the series commutator type, adapted to be used on alternating or direct current. In addition to the armature and commutator, the motor shaft 200 carries a governor 210 at the right end of Fig. 2, and suitable arrangements for connecting the governor in circuit.

These connection arrangements include a pair of copper slip rings 211, 212, separated by an insulating rib 213 carried by the insulating hub 214. The slip rings 211, 212 are merely metal bands or short tubular members mounted on the insulating hub 214. An insulating hub 214 may be frictionally secured or held about a knurled or deformed portion of the armature shaft 200 so that it is fixedly secured on the shaft.

It also includes a radially extending flange 215 which carries a multiplicity of fan blades 216 and a cylindrical flange 217 which forms part of a housing for the governor make-and-break switch, comprising the contacts 218, 219.

The wiring diagram (Fig. 25) will first be explained in order that the connections between the governor and other elements of the motor driving unit may be understood. The governor comprises a pair of make-and-break contacts 218, 219, shown diagrammatically in Fig. 22, within a circle which represents the governor slip rings. Connection is made to the slip ring brushes 220, 221 by means of the slip rings and a ballast resistance 222, and a condenser 223, are connected in parallel with the contacts 218, 219. The condenser absorbs the surges of current which are caused by the making and breaking of the contacts 218, 219, and reduces sparking, and the ballast resistance 222 further serves to reduce the sparking and carry a part of the current.

The governor contacts, condenser, and resistance are connected by a conductor 224 in series with the first field winding 225, which is connected by another conductor to one of the commutator brushes 187.

The other commutator brush 187 is connected by conductor 226 to the other field winding 227, which is connected by conductor 156 to the line. The other line conductor 155 is connected to the common lead 228 from the brush 221, condenser 223, and resistance 222.

It will thus be observed that the governor make-and-break contacts 218, 219 are adapted to make and break the motor circuit, and by so doing they control the speed of rotation of the motor. Instead of placing a resistance in series with the series commutator motor for controlling its speed, a part of the resistance is incorporated in the field windings, and in addition to that the circuit is constantly subjected to make and break by the governor contacts 218, 219 so that the speed is maintained constant between a certain range of speed variation, which range is inherently necessary to cause operation of the governor.

The location of this range on the speed curve is varied by means of certain other arrangements, further to be described.

Referring again to Fig. 2, connection is made to the slip rings 211 and 212 by means of an auxiliary pair of brushes 220 and 221 (Fig. 6), which are carried by insulating bracket 230. The insulating bracket 230 comprises an arcuate piece of insulating fiber which is supported by a pair of screw bolts 231, which extend into the bores 232 (Fig. 9) in the field core 184, and are threaded into the bores 233 (Fig. 9) carried by the housing partition 185.

Thus the screw bolts 231 serve not only to support the insulating bracket 230 in place, but they clamp the field core 184 against the ends of the lugs 234.

The tubular metal spacers are interposed between the insulating bracket 230 and the field core 184 so that the bracket 230 (Fig. 2) will be suitably spaced from the core and armature and so that its brushes 220 and 221 will engage the slip rings 211 and 212, respectively.

Each of the brushes 220 and 221 is supported in the same way on the bracket 230; that is, the bracket 230 is provided with a metal stirrup 235, having a pair of attaching flanges 236, 237 riveted to an insulating block 238.

The stirrup 235 has a substantially U-shaped central portion 239 forming, with the insulating block 238, a bore of rectangular shape for receiving the brush 220, which is rectangular in cross-section.

A small wire spring 240 has one end 241 engaged behind an ear 242, which is turned up from the attaching flange 237, and has a few coils 243 wrapped around another ear 244 that is turned up at the other corner of the attaching flange 237.

The end of the spring 240 may be provided with coils 245 which extend into the rectangular bore of the stirrup 235 and engage the end of the brush 220. Thus the brush 220 is forced inwardly in a radial direction into engagement with its slip ring 211 or 212.

The brushes 220 and 221 are, as explained in connection with the wiring diagram (Fig. 22) adapted to provide a connection between the rotating governor contacts 218 and 219 and the fixed conductors, which control the motor circuit.

The slip ring 212 is provided with a radially extending flange 250, which is connected by means of rivets 251 (Fig. 2) with the brass angle bracket 252 (Fig. 3).

The brass angle bracket 252 has a supporting flange 253, which is riveted to the radial flange 215 of the governor housing, and it has another supporting flange 254 at right angles thereto, for carrying the spring contact arm 255 and the stiffener spring 256, both of which are secured to the flange 254 by rivets 257.

The contact spring arm 255 carries the governor contact 218, which is preferably constructed of a suitable metal alloy adapted to break the currents without pitting.

The slip ring 211 is likewise provided with a radial flange 260, which extends inward on the insulating hub 214, and is spaced from the armature windings by an insulating washer 261.

The flange 260 is connected by means of rivets 262 to the brass angle bracket 263. This bracket likewise has a flange 264 at right angles to its attaching flange 265. The flange 264 is riveted to the resilient contact arm 266, which carries the make-and-break contact 219.

The spring members 266, 256, and 255 are preferably made of tempered steel. Thus, it will be observed that the slip ring 211 is in contact with the contact 219, as shown diagrammatically in Fig. 25. It will also be observed that the two contact-supporting springs 255 and 266 are supported eccentrically of the center of the drive shaft 200 and the spring arms 255 and 266 extend transversely to the radius of the governor housing 215 so that centrifugal force tends to move the contacts 218, 219 in a direction transversely to the length of the springs 255 and 266; that is, centrifugal force, acting on the mass of the springs and the contacts 218, 219, tends to move both contacts 218, 219 outward in Fig. 3, when the parts are rotating.

The contact 218 thus assumes a position which is determined by the speed of rotation, the mass of the movably mounted parts 218, 255, 256, and the resilient opposition which the spring members 255, 256 exert against the centrifugal force.

The spring 266, however, and the contact 219 assume a position which is determined by a controlling apparatus, and this is accomplished by means of the following mechanism.

Spring 266 has an aperture for passing the headed connecting rod 270. The head of the connecting rod 270 engages the upper side of spring 266 (Fig. 3) so that it is adapted to draw the spring 266 downward or radially inward, but the spring 266 is not affected by the connecting rod 270 when the head of the connecting rod is spaced above the spring 266. Connecting rod 270 has a laterally bent crank end 271, which is again provided with a longitudinally bent end 272 adapted to retain the crank portion 271 in an aperture 273.

The governor body also supports a control lever bracket 280, comprising a sheet metal member, having a flat body 281, which is secured to the insulating member 215 by rivets, and which is provided with a pair of laterally projecting bearing ears 282, 283. Each bearing ear has an aperture for receiving the trunnions 284 of the governor control lever 285. The governor control lever comprises a sheet metal member, having a flat body, provided with a pair of upwardly projecting lugs 286, 287, spaced sufficiently to embrace the flat surfaces 288 on the hub of a governor collar 290.

The governor control lever has the laterally projecting trunnions 284 pivotally mounted on control lever bracket 280, and it has an inwardly turned crank arm 291, with an aperture 273 for receiving the crank 271 of the connecting rod 270.

Thus the connecting rod 270 is pulled downward when the governor control lever 285 moves inward in Fig. 3, and vice versa. The governor control lever and the collar 290 are adapted to determine the position of the lower contact arm 266 and contact 219.

The governor collar 290 comprises an annular member made of insulating material, such as fiber, having a radially projecting circular flange 295, and provided with a hub 296, which has flat side surfaces 288. The flat surfaces engage the inner edges of the legs 286, 287 of the governor control lever 285, by virtue of which the collar is caused to rotate with the shaft, although it is slidably mounted on the shaft by means of a cylindrical bore 297.

Referring to Fig. 2, the armature shaft 200 slidably carries the collar 290, and it is provided with a fixed annular stop member 300, comprising a metal member of brass, which has a tight frictional fit on the shaft 200 so that it is adapted to limit the movement of the collar 290.

The rear cover 98 of the housing is provided with a cylindrical bore 301 for receiving the reduced cylindrical end 302 of a rear bearing 303.

The rear bearing 303 has a cylindrical bore 304, serving as a bearing for the shaft 200, and it has a partially cylindrical enlargement 305 between two reduced cylindrical end portions 302 and 306.

The partially spherical center portion 305 may have a limited universal engagement at 307, with a complementary partially spherical surface or conical surface on the housing cover 98, surrounding the bearing bore 301.

The bore 301 communicates with a threaded counterbore 308 adapted to receive a shaft adjustment screw 309, which is used to take up the end play on the shaft. The rear housing cover 98 is also formed with a counterbore 310, communicating with the bore 301 and adapted to receive the enlarged portion 305 of the rear bearing 303.

Counterbore 310 is provided at its outer end with an annular shoulder 311 for receiving a spring-retaining plate 312. A spiral spring 313 is compressed between the plate 312 and the bearing 303 and is adapted to hold the bearing 303 against the surface 307, and also to prevent rotation of the bearing 303.

The plate 312 may be retained in its recess 314 by being riveted in or by deforming the adjacent part of the rear housing cover 98.

The rear cover 98 of the housing is formed with a tubular portion 315 surrounding the bore 310 and also with a plurality of symmetrically located camming surfaces 316 surrounding the tubular portion 315.

The camming surfaces 316 are adapted to cooperate with complementary camming surfaces 317 carried by a governor cam member 318. The governor cam consists of a cast metal member of tubular shape, one end of which is open and provided with camming surfaces 317 of similar shape to the fixed camming surfaces 316 carried by the housing cover 98.

The governor cam has an inner bore 319 slidably receiving the tubular member 315, upon which it is also adapted to be rotated. At its left end (Fig. 2) it is provided with an inwardly extending flange 320 and an axially extending flange 321.

A brass annulus 322, serving as a thrust bearing, is seated against the radial flange 320, within the annular flange 321, where it may be secured by deforming a part of the flange 321, such as a partial riveting operation.

The thrust annulus 322 engages the right end of the collar 290 and is adapted to reciprocate the collar axially on the shaft 200.

In order to effect a rotation of the cam member 318, it is provided with a plurality of longitudinally extending slots 323 for receiving the inwardly extending lugs 324 of a cam-actuating plate 325. The cam-actuating plate 325 comprises an insulating member, such as a circular piece of fiber which fits within the cylindrical bore 326 in the rear housing cover 98, where it is mounted for rotation against an annular shoulder 327.

It is provided with a centrally located bore 328 for receiving the cam member 318, and with the radially inwardly extending lugs 324, which extend into the slots 323 of the cam member 318. Thus the plate 325 is adapted to rotate the cam member 318.

A helical coil spring 329 is compressed between the cam-actuating plate 325 and a radial flange 330, carried by the governor cam 318. Thus the governor cam 318 has its camming surfaces 317 urged into constant engagement with the surfaces 316, and the cam actuating plate 325 is constantly urged toward the left in Fig. 2 to maintain its contacts in engagement with electrical contacts or insulating surfaces carried by a stator plate 331.

The stator 331 also comprises a circular insulating plate of fiber or the like, which also fits within the bore 326, where it is, however, fixedly secured by a radially projecting lug 332 extending radially between two parts of a flange 333.

The stator plate serves as a support for fixed contacts 335, 336 (Fig. 4) comprising arcuate strips of metal, such as copper, having bent ends 337, which pass through slots 338 in the stator 331, to retain the contacts on the stator. These contacts 335, 336 are adapted to be bridged by a movable contact member 340 (Fig. 7), having a centrally supporting body 341, secured to the rotor 325 by rivets 342 and having the free laterally projecting contact flanges 343, 344.

Figure 25:
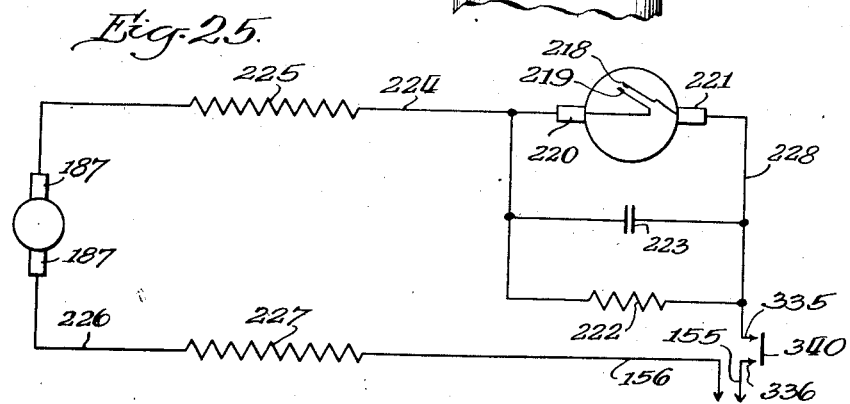
Fig. 25 is a wiring diagram of the electrical circuits employed.

The contact flanges 343, 344 are adapted to engage the fixed contacts 335, 336 when the rotor 325 is in proper position, and these contacts 340, 335, 336 are adapted to energize or deenergize the motor circuit, and they correspond to the contacts shown diagrammatically in the wiring diagram of Fig. 25.

The stator plate 331 and rotor 325 are each preferably provided with a multiplicity of holes 350 for permitting air to pass freely through these two members from the end of the rear housing cover, which is also provided with ventilation apertures in the form of slots 351 (Fig. 1).

The central motor housing member 127 is also provided with ventilation apertures such as the slots 352 at the bottom thereof, so that the fan, consisting of the blades 216 of the governor body 215, may draw air from the rear apertures 351 and force it, by means of centrifugal action, through the spaces between the motor field and the housing and between the armature and the field, and out of the apertures 352, to effect a cooling of the motor.

The stator 331 is retained in the bore 326 by a plurality of angle metal brackets 353 (Fig. 2), each of which has an inwardly extending end engaging the stator 331, and a laterally turned attaching flange, which is secured to the rear cover 98 of the housing by screw bolts 354 passing through the bracket 353 and threaded into a bore in the cover.

The pressure of the spring 329 against the rotor 325 causes it to engage the stator 331 and holds the stator in engagement with the brackets 353.

In order to hold the rotor 325 in any of a plurality of predetermined positions, the rotor is preferably provided with a metal friction member comprising a partially spherical member 355, having a rivet stud 356 for securing it to the rotor 325.

A spacer member engages the right hand surface of the stator 331 in Fig. 2, and prevents the rotor from tilting, which it would otherwise do, on account of the location of the contact 340 on the side of the rotor opposite to the spacer.

The rotor 325 is adapted to be rotated by means of a switch arm, comprising a metal member, having its attaching flange 358 secured to the rotor by a plurality of rivets 359.

The switch arm 153 has an offset portion 357 intermediate its end extending longitudinally of the housing cover 98 inside the cover, to bring its outer end into registry with the slot 152.

The end of the switch arm 153 carries an insulating thumb piece 360 to be grasped by the fingers when the switch arm is to be moved to actuate the rotor 325.

The housing is preferably provided with indicia, such as "Off" at one end of the slot 152, and numbers running from one to twelve, for example, or any other suitable range, cooperating with the point 361 of the thumb piece 360 so that the user may easily set the motor at any predetermined speed indicated by the numerals. The gradation of speed, however, is constant from one end of the range of speed to the other, the lower end of the slot 152 corresponding to the off position of the contacts 340, 335, 336. The arcuate length of the contacts 335, 336 is such that contact is maintained throughout the rest of the range of movement of the switch arm 153.

The operation of the speed controlling governor and switch arm is as follows: When the switch arm is in the "off" position, the first increment of rotative movement of the switch arm 153 will cause the contacts 340, 335, and 336 to become engaged, and the motor will be started. At this time the governor contacts 218, 219 are in the position of Fig. 3; that is, the closed circuit position; and as soon as the motor shaft begins to rotate the centrifugal force, acting on the contact 218 and arm 256, will cause this contact and arm to move radially outward in a direction to disengage it from the contact 219.

The position of the contact 219 is, however, determined by the connecting rod 270, which is governed by the control lever 285 and collar 290, which, in turn, are controlled by the axial position of the cam 318. The position of the cam 318 is governed by the position of the rotor 325 connected to switch arm 153. Thus the switch arm 153 is adapted to determine the position of what may be termed the adjustable contact 219. The position of the contact 219 varies with the setting of the switch arm 153, and it may be caused to approach closer toward the contact 218 by moving the switch arm 153; that is, the radial position of the contact 219 is varied by means of the switch arm 153, and thus the speed at which the contact is broken at 218, 219 is varied.

When the motor speeds up beyond a certain point, the contacts 218, 219 open, and it coasts until, due to additional load or friction, its speed is again diminished until contact is again made. The motor is alternately driven and shut off, but, as its speed of rotation is very high, the variation in R. P. M. is not such as to be noticeable to the user, and for the purposes of the user the motor is maintained at substantially constant speed, although the contacts 218 and 219 may be periodically or frequently making and breaking.

The partition 185 (Fig. 2) between the middle or main housing 127 and the gear housing 128 is provided with a substantially cylindrical boss 198 for receiving the main bearing 199. The motor shaft 200 is provided with a worm or screw thread 370 adapted to mesh with a worm gear 371 carried by a juicer drive shaft 372.

The end of the motor shaft 200 engages a steel ball 373, which is located in a substantially cylindrical recess 374 in an inwardly projecting cylindrical member 375 carried by the gear housing. The end of the bore 374 is riveted or spun over to retain the ball 373 in the cylindrical bore 374, the ball serving as an anti-friction thrust bearing for the end of the drive shaft.

The cylindrical member 375 has a reduced threaded portion 376, which is mounted in a threaded bore 377 in a sleeve 378, which is integral with the gear housing, and the slot 379 may be engaged by a screw driver or other tool to adjust the position of the ball 373 and take up any play in the shaft. The threaded portion 376 is exposed in a recess 380 in the front end of the gear housing 128.

Referring to Fig. 12, it will be seen that the gear housing 128 is separated into a gear chamber 381 and a condenser chamber 382 by a substantially plane partition 383, which may form an integral part of the gear housing, and which has a horizontally extending portion 384'.

The chamber 382 may be utilized for receiving a condenser 223 (Fig. 25) of suitable size to reduce the tendency toward sparking at the contacts. The chamber 381 contains all the gears and their shafts for driving beater elements 35, 36, a juicer shaft, and a drive shaft for food choppers and other attachments.

The juicer shaft 372 may comprise a substantially cylindrical shaft, provided with a worm or screw 384 for meshing with the gear 385 (Fig. 12) carried by the power takeoff shaft 386.

The juicer shaft is provided at its lower end with a cylindrical recess 387 for receiving a steel ball 388 which is retained in place by riveting over the bore 387 at 389. The lower end of shaft 372 is rotatably mounted in a cylindrical bore 390 formed in an integral bearing lug 391, and the ball 388 serves as a thrust bearing for the worm 384, which is so arranged that it has a downward thrust upon it.

The worm gear 371 may consist of a toothed fiber annulus, which is a pressed fit on the brass hub 392 of the helical spur gear 393, formed integrally with the lug 392. Gears 371 and 393 are both secured in place on the shaft 382 by a set screw 394.

The upper end of the juicer shaft 372 is rotatably mounted in a cylindrical bore or bearing 395 formed in a tubular portion 396 of the gear housing. The tubular portion 396 is preferably cylindrical at its external surface 397, and it is surrounded by an internally tapered second tubular flange 398, thereby leaving a tapering annular space 399 for receiving the externally tapered tubular supporting member 400 of the juicer bowl 401.

The upper end of the juicer shaft 372 is provided with a cylindrical bore 402 for receiving the complementary end portion 403 of a reamer shaft 404. Oppositely located axially extending slots 405 are provided at the upper end of juicer shaft 372 for receiving the pressed radial flanges 406 carried by the reamer shaft 404.

The reamer 407 may be constructed of beetle ware or of porcelain, and it is a substantially half egg-shaped member provided with a plurality of radially extending ribs 408 on its outer surface.

The ribs extend in substantially the direction of the reamer shaft 404, and the reamer is provided with an aperture 409, and with slots 410 for receiving the upper end of reamer shaft 404 and receiving the radial ribs 411.

The reamer is secured to the end of the reamer shaft 404 by cement 412 or other suitable means.

The juicer bowl 401 may consist of a bowl of glass ware or porcelain or other suitable molded material, such as a phenolic condensation compound, having a bottom 413 bordered by an upwardly extending border flange 414 and provided with a centrally located tubular formation 415 projecting above any possible level of juice in the bowl and preventing the leakage of juice along the reamer shaft 404.

The tubular formation 415 has a centrally located bore 416 adapted to receive a metal sleeve 417, the upper threaded end of which is provided with an annular nut 418. At its lower end, just below the bowl, the sleeve 417 supports a metal washer member 419 and rubber gaskets 420 may be interposed between the washer 419 and the hub 415 of the bowl and between the hub 415 and the nut 418.

The sleeve 417 may have pressed deformations projecting radially from its surface below the washer 419, serving as retaining shoulders, and thus the hub 415 of the bowl may be clamped between the washer 419 and nut 418, the washer 419 engaging the lugs 421. The sleeve 417 is provided with a relatively thin, tapered end portion 422 adapted to be received in the annular space 399 between the tubular members 398 and 396 on the gear housing.

The sleeve portion 422, being tapered, the bowl may thus be supported on the gear housing of the motor by placing the tapered portion 422 in the recess 399. Since both walls of the annular recess 399 and the inside and outside of sleeve 400 are frustoconical the sleeve may be fixedly secured by being wedged into the recess. Thereafter the reamer shaft 404 may be inserted and rotated until its flanges 406 register with the slots 405, and thus the reamer is in position to be driven by the juicer shaft 372.

The bowl 401 is preferably provided with a depending integral tubular discharge spout 423 having formed therein an exterior peripheral groove 424 for receiving the inwardly pressed lugs or rib 425 carried by a curved sheet metal spout 426. By means of the curved sheet metal spout the juice may be directed in various directions, as the spout 426 may be turned on the bowl spout 423 to change the direction of discharge of the juice.

The gear chamber 381 is open at its rear side (Fig. 8), but is adapted to be closed by means of a metal plate, such as a sheet steel plate 430, which is provided with a fiber gasket 431, and screwed against a shoulder 432 in the gear housing 128 by a plurality of screw bolts 433 passing through the plate 430 and gasket 431 and threaded into threaded bores in the gear housing 128.

The plate 430 and gasket 431 are provided with oblong apertures 434 for passing the bearing sleeve 198 of the main bearing 199 and a similar integral sleeve 435 carried by the partition 185, which is provided with a cylindrical bore 436, serving as a bearing for a power shaft 386.

The gear housing 128 at its forward end is provided with an inwardly projecting sleeve 439 having a cylindrical bore 440, which communicates with a tapered counterbore 122, serving as a power takeoff socket.

The power takeoff shaft 386 is provided with a reduced cylindrical portion 441 receivable in the bearing bore 436. This end of the shaft is provided with a cylindrical socket 442 for receiving the steel ball 443, which is retained by riveting over a part of the shaft 437 outside of the ball 443.

The ball 443 serves as an anti-friction thrust bearing for the shaft 386 and a helical gear 385, which is so arranged as to cause a thrust toward the left in Fig. 8 on the shaft 386.

The power shaft 386 is provided with a larger cylindrical portion 446, upon which the helical gear 385, which is preferably made of steel, is secured by a pressed fit against an annular shoulder 447.

The enlarged cylindrical portion 448 of the power takeoff shaft 386 fits in the bearing bore 440, and the end of the shaft is provided with a rectangular slot 449 for engagement with the shaft of any of a plurality of food-treating attachments. The slotted end 450 of this shaft projects into the enlarged counterbore 122.

Referring to Fig. 13, this shows a meat grinder or food chopper, one type of attachment which is adapted to be driven by means of the power takeoff shaft 386. This food chopper has already had a part of its structure described in connection with the securing device 175, which is adapted to project into the bore 177 in the hub 178.

This securing device has its latching member 175 secured to the spring 168 by riveting so that the thumb piece 174 may be pressed toward the left in Fig. 13 to release the hub 178.

The latching member 175 not only secures the hub 178 in the power takeoff socket 122, but prevents its rotation, and of course the shaft 451 of the food chopper must have its flattened end 452 so rotated that it will be received in the slot 449.

The food chopper 180 may comprise a cast metal member having a tapered tubular body 453 for receiving the tapered driving screw 454.

The body 453 is open at its right end, and at its left end it is provided with the hub 178 having an internal cylindrical bore 455 for receiving the shaft 451 of the food chopper. At its upper side the tapered tubular body 453 is provided with a feed spout 456, which is preferably long enough so that one feeding meat or other food to be ground cannot reach the screw flange 456' with the fingers, thus increasing the factor of safety in the use of the food chopper.

The feeding aperture is at the rear or left end of the food chopper in Fig. 13, and it is adapted to communicate with the space 457 between the turns of the screw flange 456'. The screw 454 has an annular shoulder 458, which engages the rear wall surface 459 of the food chopper body, and the screw 454 may be provided with a threaded bore 460 for receiving the threaded end 461 of a shaft extension or trunnion 462, which has a non-circular portion 463.

The shaft extension 462 may be driven home in the bore 460, and it secures in place a steel washer 464 adapted to serve as a thrust bearing. The cutter 465 comprises a metal member having a plurality of radially projecting arms 466, each of which is provided with a forward cutting edge 467, the cutting edges all being in the same plane and adapted to engage the inner surface 468 of the squeeze plate 469. The cutter 465 has a noncircular centrally located aperture 470 for engaging the non-circular portion 463 on the shaft extension 462. The squeeze plate 469 serves as a bed plate for the cutter 465 and comprises a metal plate preferably constructed of steel, formed with a centrally located hub 471, having a bearing bore 472, receiving the shaft extension 462. The squeeze plate 469 is provided with a multiplicity of apertures 473, the size of the apertures determining in some degree the fineness of cut of the food chopper, as the blades 466 of the food chopper rotate against the inner plate 469 and cut off portions of meat or other food which are forced into and out of the plate 469 by the screw 454.

The plate 469 is secured in the chopper housing 453 against the annular shoulder 474 by a threaded sleeve 476, having an inwardly extending flange 475, engaging the plate 469.

The threaded sleeve has internal threads engaging the threads 477 on the chopper body. The interior of the tapered housing 453 of the food chopper is provided with longitudinally, that is, axially extending grooves 478 for accommodating the food material in the housing as it is engaged by the screw and forced longitudinally of the housing 453.

The presence of the grooves 478 permits the food chopper to be operated with greater ease, as the grooves 478 permit material to be slid along these grooves by the flange 456 of the screw 454, without such great compression of the material as might otherwise be caused. The grooves are adapted to accommodate the firmer and less compressible portions of the food being put through the food chopper, should they become engaged with the flange 456'.

A metal pin 479, engaged in a threaded bore 480 in the end of the chopper housing 453, engages in a peripheral groove 481 in the plate 469 and prevents its rotation.

The present food chopper attachment 180 can be attached to the mixer driving unit with a minimum amount of effort, as it is only necessary to press back on the thumb piece 174 and insert the hub 178 in the power takeoff socket 122.

While holding the thumb piece 174, it is advisable to rotate the complete chopper 180 in the socket 122 until the flattened end of the shaft 452 finds the power shaft groove 449, whereupon the insertion of the hub 178 and shaft 451 can be completed. Thereupon the chopper attachment 180 is moved with its feed spout 456 to the vertical position and the latching member 175 will snap into the socket 177 to secure the chopper on the driving unit.

It is not necessary to provide any auxiliary detachable gear housings with the present unit, and the mechanical difficulties of attachment are eliminated by providing a direct power takeoff shaft for the food chopper. The power takeoff shaft is driven through the following gears: motor shaft 200 drives the screw 370, which drives screw gear 371. The gear 371 is carried by the shaft 372, which drives the reamer shaft 404 of the orange juicer. The reamer drive shaft 372, by its screw 384, drives the worm gear 385, which is fixed to the power takeoff shaft 386. By means of these gear arrangements the power takeoff shaft may be driven at an ideal speed for the food chopper, such as, for example, 50 to 60 revolutions per minute, and the juicer shaft may be driven at an ideal speed for such a juicer, such as, for example, about 175 R. P. M.

The mixing elements are preferably driven at about 1,000 to 1,100 R. P. M. by means of the following arrangements: The spur gear 393 is adapted to mesh with another helical gear 500 (Fig. 12), which is carried by one of the beater drive shafts 501. The shaft 501 also carries a second steel spur gear of the helical type 502, which is adapted to mesh with a fiber gear 503, carried by the other beater drive shaft 504.

In order to rotatably support the beater drive shafts 501 and 504, the gear housing 128 is provided with a pair of vertical bores 505 and 506 in the lower wall 507 thereof. The structure of each of the drive shafts 501, 504 is the same, and therefore only one need be described in detail.

The bores 505 and 506 each contain a bearing bushing 508, which may be a tight pressed frictional fit in each bore.

Each bearing bushing 508 projects slightly below the end of the tubular extension 509 of the bore 505, and is adapted to be surrounded by an oil retainer collar 510. The beater drive shaft 501 may consist of a tubular metal member 511, which is fixedly secured by a key, or otherwise, to the hub 512 of the gear 500. The hub 512 also supports the other gear 502, the two gears being driven together, and at its upper end the sleeve may be provided with a plurality of longitudinally extending slots 513, such as slots formed by a saw-cut.

The internal bore 514 of the hub 512 of gear 500 is preferably closed by a metal button 515, which is a pressed fit in the bore and prevents grease from running down the internal bore or socket 516 of the tubular shaft 501. The lower end of the tubular member 511 is provided with a reduced cylindrical portion 517 for receiving a bore 518 in the oil retainer cap 510.

The reduced cylindrical portion 517 is then riveted over at 519 to retain the cap in place, and a felt oil retainer bushing 520 is enclosed in the space between the cap 510 and the end of the bearing bushing 508. A set screw 521, threaded into a threaded bore in the hub 512, secures the hub 512 to the tubular member 511. The gears 502, 503 are of the same size, and therefore both beater shafts rotate at the same speed, but in opposite directions. The rotation is derived from the motor drive shaft, as follows: Shaft 200 with screw 370 drives the screw gear 371 on shaft 372, which drives the gear 393 that engages the gear 500. Gear 500 on shaft 501 drives that shaft and with it gear 502, which drives gear 503.

Each of the beating elements 35, 36 has the same structure, and therefore only one of them need be described in detail. Each beating element comprises a pair of metal strips 522, 523 (Fig. 1), the metal strips being curved to the oblong shape, as shown in Fig. 1, and each strip having an aperture for receiving the reduced cylindrical portion 524 of the beater rod 525, the latter being riveted over at 524 to retain the two strips 522, 523. The upper ends of these two strips are bent longitudinally of the beater rod 525 and are frictionally held inside a metal sleeve 526 (Fig. 1).

The shape of the curved beater elements is preferably oblong, as shown in Fig. 1, tapering from the bottom toward the top, so that the width of the beater element increases toward the bottom. This provides the most effective shape of beater element and one which may be very conveniently cleaned, and which will perform many different operations, such as whipping, beating, or mashing, with the greatest efficiency.

The upper end of each beater element (Fig. 2) is provided with a slot 527 for receiving a latching spring 528, which is secured in the slot by deforming the body of the rod adjacent the slot at two points 529, 530, to rivet the spring in place.

The upper end of the spring is free and has a curved camming shoulder 531, which is adapted to project radially beyond the body of the beater rod 525 into the slot 513. Thus, when the beater elements 35, 36 have their upper ends forced into the bore 516, the camming end 531 of the spring is pressed into the slot 527 until the hump 531 reaches registry with the slot 513. It then springs into the slot 513, whereupon the beater element is retained in the beater shaft 501, and it also determines the proper rotative position of the beater strips 522, 523 or points at the bottom of the beater elements.

These must be so located with respect to each other that they rotate between each other as the beaters are driven. The beater elements may be removed by a pull which will cause the spring hump 531 again to recede into the slot 527 until the beater rod 525 has been wholly withdrawn from the bore 516.

The gear chamber 381 may be filled with suitable fiber lubricant which is so thick that it will not run, but it maintains the gears in a state of adequate lubrication for a long period of time.

In order to keep the lubricant in place the gear chamber 381 is provided with a cover 430 and gasket 431, which prevent the grease from running out toward the left in Fig. 8 and getting into the electric motor structure.

The cover 430 fits against the partition walls 383, 384', shown in Fig. 12.

Referring to Fig. 14, the present driving unit is also adapted to drive a shredder or slicer, such as that shown in Figs. 14 and 15. The shoulder or slicer, indicated in its entirety by the numeral 532, has a metal hub 533 of tubular shape, having a centrally located bore 534 adapted to receive the drive shaft 535, which is similar in structure to the end of the drive shaft 451 of the food chopper. Thus it may be brought into engagement with the power takeoff shaft 386 of the driving unit, and the hub 533 is of similar structure to the hub 178 of the food chopper so that it may be held by the same latching member 175.

The hub 533 has a reduced cylindrical portion 536 at its right end (Fig. 14) adapted to be received in a centrally located bore 537 of a shredder or slicer housing 538. The end of the reduced cylindrical portion 536 is riveted over at 539 to secure the slicer housing to the hub 533.

The slicer housing 538 comprises a frusto-conical member having a flat end wall 540 and the frusto-conical side wall 541, which is provided with an outwardly curved lip 542 at its outer end. At its upper side the slicer housing is provided with a rectangular aperture 543 and there is secured thereto an upwardly extending rectangular casing 544 adapted to serve as a hopper for the material to be sliced.

The hopper 544 may be secured to a pair of upwardly extending flanges 545 of the slicer housing 538 by spot-welding. It comprises a strip of metal which is bent to rectangular form and provided with curved edges for engaging and fitting the frusto-conical wall 541 surrounding the aperture 543.

In order that there may be no possibility of the operator placing his fingers in the hopper 544, a feeding block may be provided in the form of a sheet metal member 546, which may be constructed of two pieces. The handle or top member comprises a central, flat body 547, with a pair of flanges 548 bent over at each end thereof. The bottom portion of the feeding block comprises a partially cylindrical flange 549 and two upwardly extending legs 550, each of which has an outwardly bent flange 551 that is caught between the body 547 and flange 548.

The size and shape of the feeding block 546 is such that it is a substantially sliding fit in the hopper 544. The drive shaft of the slicer (Fig. 14) is provided with an inwardly extending slot 551 for receiving the end of a retaining plunger 552, which is mounted in the hub 533 (Fig. 15). The plunger 552 has a knurled thumb piece 553, a cylindrical shank 554, and a radially extending flange 555.

A spring 556 is compressed between the flange 555 and the end of the body cap 557, which has an aperture for passing the shank 554. The body cap 557 is threaded into a threaded bore 558 in the hub 533 and thus the plunger 552 is adapted to retain a shredding or slicing member 560 in the slicer housing 538. The shredding member may be very quickly withdrawn, however, and a slicer substituted, or vice versa, by merely lifting the plunger 552 with its thumb piece 553 and drawing the slicer or shredder 560 out of the housing 538. The substitute slicer or shredder member may be placed in its housing 538 by merely holding the plunger 552 up during this operation.

The slicer and shredder members 560 differ only in the size of apertures and shape of edges, and therefore only one of them need be described. The slicer 560 comprises a substantially frusto-conical sheet metal member having a flat end flange 561 and a frusto-conical side flange 562, terminating in an outwardly curved end flange 563.

The size of the slicer 560 is such that it has a predetermined clearance at 564 with respect to the walls 540 and 541 of the slicer housing 538. The end wall 561 may be reinforced by a metal plate 565, and both the metal plate 565 and end wall 561 may be secured on a reduced cylindrical portion 566 of the shaft 535 by riveting over the end of the shaft at 567.

The frusto-conical side walls 562 of the slicer are provided with a plurality of slots 568, the metal adjacent each slot 568 being bent outward, out of the plane of the flange 562 to form a blade portion 569, which projects from the body of the slicer 560.

The blades preferably extend diagonally across the opening 543 in the hopper 544, and therefore the slots 568 do not extend along the elements of the cone, but at an angle thereto. The outer part of each blade 569 is ground away to produce a fine cutting edge which is adapted to engage the material to be sliced, which is placed in the hopper 544. Shredders may be made of different sizes, and the size of the shreds will depend upon the size of the apertures.

In such case the slots 568 are replaced by oblong or round apertures, each aperture having a blade also in the same manner as the blades 569.

The operation of the shredder will be apparent from Fig. 14. The blades 569 not only move transversely across the material in the hopper 544, but the edge of the blade has a slicing motion due to its diagonal direction, which makes the slicer operate very effectively, the slices which are cut off depending upon the width of the slots 568 and the amount of outward bend of the blades 569.

The present slicer is adapted to produce slices of fixed thickness, and the slices fall inside the slicer 560 and out of the open right end thereof in Fig. 14, where a bowl may be placed on the base to receive them.

The gear housing 128 is preferably formed at its lower right face with a non-circular socket 580 adapted to receive a complementary lug 581 carried by the motor housing 127. When the lug 581 is received in the socket 580, the holes for the screw bolts 131 in the housings 127 and 128 are automatically brought into registry, thereby facilitating the assembly of the device with a minimum amount of labor.

A similar structure is provided at the opposite end of the housing 127 by means of a socket 582 for receiving the lug 583 carried by the rear housing cover 98, base, and turntable. The turntable may readily have its bearing located for use with bowls of any of a plurality of different sizes. It is only necessary to push on the turntable when its trunnion is in the bearing, to cause the bearing carriage to move into the desired position.

The present base and stand structure supports the motor at its rear end instead of a point midway between the ends, as in the devices of the prior art; and therefore the motor may be provided with a greater overhang, permitting the use of larger vessels.

Instead of endeavoring to balance the motor upon its pivot, the present motor unit is adapted to be held in elevated position by a spring latching means, and it is not necessary to elevate the motor the same degree in the present device as it is in the devices of the prior art, where the motor must be moved over until its center of gravity is located behind the column.

The present driving unit is adapted to be used for driving all sorts of food attachments at the ideal speed for each attachment, and it is not necessary to provide auxiliary and separate gear housings, which may become lost, and which involve considerable difficulty and delay in their attachment to the motor driver.

By means of an improved handle structure the power takeoff socket may be completely covered and concealed when the handle is in place, and the handle may be removed so that it will not interfere with the location of other food attachments, such as a fruit juicer.

As distinguished from the devices of the prior art, the present motor driving unit is provided with a speed control which is adapted to maintain a substantially constant speed of operation of the various food attachments, irrespective of the amount of load which is placed upon the motor. The speed is controlled with economy of the use of current because the current is momentarily shut off and the circuit broken to control the speed of operation, instead of dissipating large amounts of heat by means of speed controlling resistances.

The speed controlling governor is capable of continuous adjustment from maximum to minimum, without steps, and operates to maintain the speed of the motor substantially constant at any of the various adjusted speeds.

The speed reduction gearing is as nearly silent as possible and so arranged that the gears may be provided with constant lubrication in the form of thick lubricant, such as fiber grease, so that the motor is adapted to operate for a long period of time without any particular attention or repair.

The various food attachments are quickly and easily attachable and detachable with a minimum number of movements of the operator, so that the work of utilizing these attachments does not become onerous, as may be the case with many of the devices of the prior art. When the difficulty and labor of using a food attachment is particularly onerous, the tendency is for the user of the food-working machine to dispense with the attachment, but the present attachments may be so easily applied that the usefulness of the food mixer is greatly enhanced thereby.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an electric food mixer, the combination of a motor drive unit with a supporting handle, said motor drive unit being provided with a pair of sockets opening in the same direction for receiving lugs carried by said handle, and latching means for securing said handle with said lugs in said sockets, whereby the weight of said motor is borne by the inter-engagement of said lugs and sockets.

2. In an electric food mixer, the combination of a motor drive unit with a supporting handle, said motor drive unit being provided with a pair of sockets opening in the same direction for receiving lugs carried by said handle, and latching means for securing said handle with said lugs in said sockets, whereby the weight of said motor is borne by the inter-engagement of said lugs and sockets, said motor driving unit being provided with a power take-off socket having a shaft end exposed therein, and said handle having means for covering said power takeoff socket.

3. In a driving unit for an electric food mixer or the like, the combination of an electric motor, having its field, armature and shaft, with controlling means for said electric motor comprising a rotor having a rim defining a recess therein for housing a governor switch, a governor switch comprising a pair of leaf spring contact arms provided with inter-engaging contacts and arranged in the recess to be moved by centrifugal force acting on said rotor, one of said contact arms being adjustably mounted, and the other of said contact arms being free to be acted upon by centrifugal force.

4. In a driving unit for an electric food mixer or the like, the combination of an electric motor, having its field, armature and shaft, with controlling means for said electric motor comprising a rotor having a recess therein for housing a governor switch, a governor switch comprising a pair of leaf spring contact arms provided with inter-engaging contacts and arranged to be moved by centrifugal force acting on said rotor, one of said contact arms being adjustably mounted, and the other of said contact arms being free to be acted upon by centrifugal force, said adjustably mounted contact arm being actuated by an axially movable member mounted on said shaft, and manual means for controlling the position of said axially movable member.

5. In a driving unit for an electric food mixer or the like, the combination of an electric motor, having its field, armature and shaft, with controlling means for said electric motor comprising a rotor having a recess therein for housing a governor switch, a governor switch comprising a pair of leaf spring contact arms provided with inter-engaging contacts and arranged to be moved by centrifugal force acting on said rotor, one of said contact arms being adjustably mounted, and the other of said contact arms being free to be acted upon by centrifugal force, said adjustably mounted contact arm being actuated by an axially movable member mounted on said shaft, manual means for controlling the position of said axially movable member, said manual means comprising inter-engaging cams carried by the motor housing and engaging said axially movable means.

6. In a motor driving unit for food mixers or the like, the combination of a housing comprising a central motor housing, a governor housing member, and a gear housing member, said latter two members being adapted to engage the ends of the motor housing to provide an enclosure for said unit, threaded means for securing the parts of said housing together, means for supporting the housings from the governing housing member, said motor housing and said members each being provided with inter-engaging lugs and sockets for providing the proper rotative position of said members with respect to said motor housing and to assure registration of said threaded means in the assembly of said housing.

7. In a controlling switch for a food mixer driving unit, the combination of a housing with a rotatably mounted insulating disc, having an actuating arm projecting through a slot in said housing, a hub carried by said housing and centrally located with respect to said disc, said hub slidably and rotatably mounting a cam sleeve having camming surfaces engaging oppositely disposed camming surfaces in the housing surrounding said hub, said camming sleeve being adapted to actuate a speed controlling member, and a second insulating disc carried by said housing, said insulating discs being provided with electric contacts for controlling the energization of said motor.

8. In a controlling switch for a food mixer driving unit, the combination of a housing with a rotatably mounted insulating disc, having an actuating arm projecting through a slot in said housing, a hub carried by said housing and centrally located with respect to said disc, said hub slidably and rotatably mounting a cam sleeve having camming surfaces engaging oppositely disposed camming surfaces surrounding said hub, said camming sleeve being adapted to actuate a speed controlling member, a second insulating disc carried by said housing, said insulating discs being provided with electric contacts for controlling the energization of said motor, and the first of said discs being non-rotatably connected to said camming sleeve, whereby rotation of the disc rotates the camming sleeve and moves it axially to actuate said speed controlling member, and spacer means for supporting the discs in predetermined cooperative relationship.

9. In a controlling switch for a food mixer driving unit, the combination of a housing with a rotatably mounted insulating disc, supported on the housing and having an actuating arm projecting through a slot in said housing, a hub carried by said housing and centrally located with respect to said disc, said hub slidably and rotatably mounting a cam sleeve having camming surfaces engaging oppositely disposed camming surfaces surrounding said hub, said camming sleeve being adapted to actuate a speed controlling member, and a second insulating disc carried by said housing, said insulating discs being provided with electric contacts for controlling the energization of said motor, and the first of said discs being non-rotatably connected to said camming sleeve, whereby rotation of the disc rotates the camming sleeve and moves it axially to actuate said speed controlling member, said speed controlling member comprising a centrifugally operable electric switch controlling said motor circuit, and having one of its contacts regulable in position by said camming sleeve.

10. In an electric food mixer driving unit, the combination of a motor housing comprising a central motor-enclosing portion, with a rearward governor-enclosing portion, the latter portion being formed with a hollow depending arm adapted to serve as a junction box, and detachable cover plate means for closing the open side of said hollow depending portion, whereby the electric conductor connections may be enclosed and may be made available for inspection without disassembling the motor unit.

11. A rotor for a speed control governor comprising a hub portion, a radial portion and a rim providing a recess to one side of the radial portion, a pair of radially movable leaf springs mounted on said rotor in the recess, one of said springs being responsive to centrifugal force, means pivoted to the rotor for moving the other spring radially, contacts carried by the springs urged normally into contact with each other, and collector rings carried by the hub and connected electrically to the contacts.

12. A rotor for a speed control governor comprising a hub portion, a radial portion and a rim, vanes at the rim for moving air, a centrifugally responsive governor mounted within the rim, means movable radially and axially for controlling the governor, and collector means in electrical connection with the governor.

13. A rotor for a speed control governor comprising a hub portion, a radial portion, a rim providing a recess to one side of the radial portion, vanes upon the rim, a radially movable spring leaf mounted in the recess and responsive to centrifugal force, a movable member, electrical contacts carried by the leaf and member, means carried by the rotor for adjusting the position of said movable member, and collector means connected electrically to the contacts through the leaf and said member.

14. In an electric food mixer, the combination of a motor unit member and supporting handle member, one of said members being provided with a pair of sockets opening in the same direction, lugs upon the other of said members receivable in said sockets, latching means detachably securing the members with the lugs in the sockets, whereby the weight of said motor member is borne by the interengagement of said lugs and sockets.

15. In an electric food mixer, the combination of a motor unit member and supporting handle member, a plurality of sets of mating sockets and lugs, disposed with one member carrying a part of each set and the other member carrying the other part of each set, said sets being arranged so that the lugs engage in the sockets upon relative movement and limiting said relative movement when one of the members is moved longitudinally with respect to the other member, whereby the weight of said motor member is borne by the interengagement of said lugs and sockets.

16. In a controlling switch for a food mixer driving unit having a shaft, the combination of a housing with a rotatably mounted insulating disk having an actuating portion extending through an opening in the housing for manual actuation, a hub carried by said housing and centrally located with respect to said disk, a cam sleeve slidably and rotatably mounted on the hub and having camming surfaces engaging oppositely disposed camming surfaces surrounding said hub, means within said hub for adjusting the axial position of the shaft with respect to the camming surfaces, said sleeve actuating a speed controlling member and means carried by the housing cooperating with an electrical contact on the disk for controlling the energization of said motor.

17. In a household food mixer having a base and support at one end, a power unit detachably mounted upon the support to be removed from and returned to the same working position in which position the unit extends longitudinally with and over the base, said power unit comprising an electric motor including a stator and armature, a substantially cylindrical housing member for supporting the stator of the motor, means for journalling the shaft of the armature with respect to said housing member with the shaft extending beyond the housing member, a rotor mounted upon the shaft including a governor switch comprising two contacts one of which is carried by a centrifugally actuated spring normally urged radially inwardly, means mounted coaxially with the shaft for varying the relative pressure exerted between the contacts, collector rings upon the rotor connecting the contacts in circuit with the motor windings, and means rotatably mounted coaxially with the shaft beyond the rotor including a manually operable member extending outwardly and forwardly around the rotor to the rear of said housing member, said members being rotatable with respect to one another, and means for indicating the relative positions of the members upon one side of the motor and base at all times when the unit is in said working position, including indicia upon one of the members and a pointer upon the other in full view from said one side.

18. In a household food mixer, a power unit comprising an electric motor having a stator and armature, a housing member supporting the stator and one end of the armature with the shaft of the armature extending rearwardly beyond the housing member, a rotor mounted upon the shaft beyond the housing member including a governor switch comprising two contacts mounted on a rotor one of which contacts is carried by a spring member flexed outwardly under centrifugal force to break engagement with the other contact, means for varying said flexing action including a follower upon the shaft rotatable with the rotor and movable axially with respect to the rotor, collector rings connecting the contacts in circuit with the motor windings, a cover member enclosing the rotor and joined with the housing member at one end, said cover member at the other end being reduced in size, a third member mounted upon the cover member for rotary movement about the axis of the motor to actuate said follower and curving outwardly and forwardly to a place on the contour of the cover member where the sides thereof approach parallel, said third member being rotatable with respect to the cover member and housing member, means on two of said members for indicating the relative positions of the members in relation to the controlled speed of the motor including indicia upon one of said two members and a pointer for the other in full view at the side of the motor where the said two members have their widest sweep.

19. In a household food mixer, a power unit comprising an electric motor having an armature shaft, a housing for the motor and shaft including two housing members joined together along a line of severance, a rotor on the shaft within the rear housing member including a centrifugal switch having two contacts, means for setting the speed at which said contacts are separated including a follower movable axially of the shaft, a member rotatably mounted upon the rear member coaxial with the shaft and beyond the rotor for operating said follower, means carried by said housing for adjusting the relative position of the rotor and said rotatably mounted member, said rotatably mounted member extending outwardly and forwardly to a place upon the housing where the sides approach parallel, and means for indicating the relative position of said rotatably mounted member including indicia upon the member and the housing.

20. In a household food mixer, a power unit comprising an electric motor having an armature shaft, a housing for the motor having substantially parallel sides adjacent the rear end thereof, said housing comprising two housing members, one of which is adapted to support the motor, two sets of switch contacts connected in series with each other and the windings of the motor, a rotor on the shaft including a centrifugal element operating the contact of one of the sets of switches including a follower movable axially of the shaft, a device rotatably mounted upon one of the members coaxially with the shaft for controlling throughout its major portion of travel the speed at which said centrifugal element separates the contacts, means mounted upon said one of said members for adjusting the axial position of the shaft and rotor with respect to said device, said device operating the other set of switch contacts during the preliminary travel of said device, said device extending outwardly and forwardly to proximate said point of parallelism of the sides where the widest relative movement is available between the device and the housing members, and means for indicating said relative movement including indicia upon the device and the housing.

21. In a household food mixer having a base, a support at one end thereof, the combination of a driving unit having a housing comprising a central motor housing, a governor housing member, a gear housing, a movable governor control handle carried by the governor housing, indicia carried by the motor housing at the line of severance between the motor housing and the governor housing, said governor housing member and the gear housing member being adapted to engage the ends of the motor housing to provide an enclosure for said unit, threaded means for securing the parts of said housing together, said motor housing and said members each being provided with interengaging lugs and sockets for establishing the proper rotative position of the members with respect to the motor housing and the handle with respect to said indicia, and the registration of said threaded means during assembly, means for supporting the housings from the governor housing member on the support in one way only to assure location of said handle and indicia upon the same side of the base each time the driving unit is removed and returned to the support.

22. In a controlling switch for a food mixer motor unit, the combination of a housing having a shoulder, a circular member perforated for the passage of air and made of insulating material and having a portion extending to said shoulder for manual operation, an element carried by the housing coaxially with the motor for rotatably mounting the circular member for relative movement of said portion at said shoulder, means for mounting a cam member axially movable with respect to the motor, a speed controlling member actuated by said cam member, a second insulating member carried by the housing and actuated by movement of the first for controlling electric contacts connected in series with the motor, one of said insulating members being non-rotative with respect to the housing, and the rotation of the other insulating member operating said cam member.

23. In a food mixer having a housing containing an electric motor, a centrifugal element mounted upon the shaft of the motor, a pair of electric make and break contacts in circuit with the motor windings and controlled by said element, a manually closing circular member made of insulating material mounted co-axially with the shaft for setting said control by said element, said circular member closing the rear end of the housing and being perforated to permit air to pass therethrough to ventilate said housing, and means upon the side of said housing for indicating the relative position of the circular element.

24. In a driving unit for an electric food mixer or the like, the combination of an electric motor, having its field, armature and shaft in a housing, with controlling means for said electric motor comprising a rotor, a governor switch mounted on the rotor, said governor switch comprising a pair of leaf spring contact arms provided with interengaging contacts normally urged towards each other and arranged to be moved by centrifugal force acting thereupon, one of said contact arms being adjustably mounted for relative movement away from the other arm, one of said contact arms being free to be acted upon by the centrifugal force to carry it away from the other, an axially movable member mounted concentrically with respect to the shaft, an element interengaging the adjustably mounted contact arm and the axially movable member to limit movement of said adjustably mounted arm towards the other arm, and means for controlling the position of said axially movable member including cam and follower elements rotatably mounted relative to each other, one of said elements being formed as a part of the housing concentrically with respect to the shaft.

25. In a driving unit for an electric food mixer or the like, the combination of an electric motor having a field, an armature and shaft, a combined speed controlling and air circulating means for said electric motor comprising a rotor having axially spaced collector rings thereon at one end, a governor switch mounted thereon at the other end, said governor switch comprising a pair of leaf spring contact arms provided with interengaging contacts electrically bridging the collector rings and arranged to be moved by centrifugal force acting on said rotor, one of said contact arms being mounted for adjustable movement, and the other of said contact arms being disposed to be acted upon by said centrifugal force, a member mounted for axial movement with respect to said shaft for actuating said mounted contact arm against the action of centrifugal force, means for controlling the position of said movable member, said means including cam and follower elements rotatably mounted relative to each other.

26. In a driving unit for an electric food mixer or the like, the combination of an electric motor having a field, armature and shaft, a combined air circulating and speed controlling means for said electric motor comprising a rotor member driven by the shaft, a governor switch carried by the rotor and comprising a pair of leaf spring arms carrying interengaging contacts, one of said arms being mounted for adjustable movement, and the other of said arms being free to be acted upon by centrifugal force induced by the rotation of said rotor, a member rotating with the shaft and movable axially with respect to said shaft, manual means for controlling the position of said axially movable member including cam and follower elements rotatably mounted with respect to each other independently of rotation of the shaft and constructed to move said member axially, said controlling means having perforations therethrough to permit the passage of air for cooling the motor.

27. In a motor driving unit for food mixers or the like, the combination of a housing comprising three assembled housing members, one for the gear train, another for the motor, and another for the governor, the latter two members having a slot at their juncture, interengaging lugs and sockets for providing the proper rotative position of said members to assure proper registration, a plurality of members mounted in the housing for relative rotation including cam and follower elements brought into proper registration by said interengagement, a switch member having an arm thereon extending through said slot and a member disposed and held in proper place by a lug and notch construction including one of the housing members for cooperation with said arm controlled member, one of said elements being integral with said governor housing.

28. In a household food mixer having an elongated base and support at one end thereof, a power unit detachably mounted upon the support to work in a predetermined position in which the unit extends longitudinally with and over the base, a handle supporting the power unit for removing and returning the unit to the support, said power unit comprising an electric motor including a stator and armature, a substantially cylindrical housing member for supporting the stator of the motor, means for journalling the shaft of the armature at one end of the housing including a circular shell member following the contour of the housing member, said members having a slot at their line of severance disposed above the plane of the shaft and adjacent one end of the handle, a rotor mounted upon the shaft including a governor switch comprising two contacts one of which is carried by a centrifugally actuated spring normally flexed towards the shaft and the other of which is carried by an adjustable spring follower flexed to oppose the centrifugally actuated spring, means mounted coaxially with the shaft for positioning said follower at any one of a number of predetermined positions, collector rings upon the rotor connecting the contacts in circuit with the motor winding, means rotatably mounted coaxially with the shaft proximate the rotor including a cam and follower for controlling the operation of said first coaxially mounted means and a manual control extending through said slot, and means for indicating said predetermined positions including indicia and a pointer, one of which is upon the manual control and the other of which is upon one of said members.

29. In a food mixer having a housing containing an electric motor, a centrifugal switch mounted upon the shaft of the motor including a pair of electric make and break contacts in circuit with the motor windings controlled centrifugally, a member made of insulating material mounted for manual rotation independently of shaft rotation and coaxially with respect to the shaft for setting the speed at which said contacts are effective to break under the action of centrifugal force, a starting switch controlled by rotation of said member, said member having openings to permit air to pass therethrough to ventilate the housing, means driven by the motor for circulating air through said openings and over the motor, and indicating means upon said member and housing to indicate the relative position of said members with respect to said setting.

30. In a controlling switch for an electrical food mixer driving unit, the combination of a cam and follower means disposed in said housing, one integral with the housing for operating a speed control governor, two insulating members mounted for relative rotation in the housing, one being positioned by a shoulder in the housing, an arm for moving one of the members extending through a semi-circumferential slot in the housing, means for actuating said cam and follower means by relative movement of the members, indicia for indicating the relative position of the members, and means operated by said members for breaking the motor circuit when the members are disposed in a predetermined relative position.

31. In a controlling switch for a food mixer driving unit, the combination of a housing, an insulating disc rotatably mounted in the housing and having an actuating arm projecting through a slot in a side wall of the housing, an element carried by the disc located centrally thereof for relative axial movement, a cam and follower means one upon the element and the other integral with the housing for axially moving said element, said element actuating a speed control device, and a second insulating disc in the housing, said discs being movable with respect to each other by means of said arm and being provided with circuit closing means for energizing said motor during a major portion of their travel.

32. In a controlling switch for a food mixer driving unit, the combination of a housing, an insulating disc rotatably mounted peripherally in the housing and having an arm secured thereto extending through a slot in said housing, cam and follower means, one supported by the housing and the other supported upon the insulating disc including an element moved axially of the driving unit when the cam and follower are moved with respect to each other by the arm, said element being constructed and arranged to actuate a speed controlling member, a second insulating disc carried by the housing, said insulating discs being provided with electric contacts for controlling the energization of the motor, movement of one of the discs from one limit of relative rotation closing the circuit between a source of electricity and the speed control member to energize the motor and further movement controlling the speed control member, said speed control member comprising a centrifugally operable electric switch controlling energization of the motor and having one of its contacts regulatable by said cam and follower means.

33. A rotor for a speed control governor comprising a hub portion, a radial portion having a rim, means carried by said rotor for moving air, a centrifugally responsive governor mounted within the rim, means movable radially and axially for controlling the governor, and collector means in electrical connection with the governor.

34. In a household food mixer, a power unit comprising an electric motor having an armature shaft, a housing for said motor and shaft, a rotor on the shaft including a centrifugal switch, means for setting the speed at which said switch is opened including a follower movable axially of the shaft, means for adjusting the position of the follower including a cam and follower construction and a rotatable member for operating said cam and follower construction, said rotatable member terminating outwardly and forwardly for movement along a circumferential line where the sides of the housing approach parallel to provide the widest sweep for said rotatable member, said rotatable member having openings through the body portion thereof to permit passage of motor cooling air therethrough, and means for indicating the relative position of said rotatable member including cooperating indicia upon the member and the housing.

35. A rotor for a combined blower and speed control governor comprising a central hub portion, a member rotating with the shaft and axially movable with respect thereto, a centrifugally responsive switch element upon the central portion, an adjustable member normally urged into contact with said switch element and movable by said axially movable member away from contact with said switch element and axially spaced collector rings upon the hub portion in electrical connection with the governor and motor circuit.

36. In an electric food mixer, the combination of a motor unit member having a shaft and means for adjusting the shaft axially and a supporting handle member, a plurality of sets of mating sockets and lugs one of which is adjacent said means, one member carrying a part of each set and the other member carrying the other part of each set, said slots being arranged so that the lugs engage in the sockets upon relative movement and limit said relative movement when one of the members is moved longitudinally into place with respect to the other member, means for releasing the engagement at one set to permit disengagement at the other, said handle covering said adjusting means when the handle is in position to bear the weight of said motor member through cooperation of the parts including the interengagement of said lugs and sockets.

SAM BEHAR.

CERTIFICATE OF CORRECTION.

Patent No. 2,262,912.　　　　　　　　　　　　　　November 18, 1941.

SAM BEHAR.

It is hereby certified that error appears in the printed specification of the above numbered patent requiring correction as follows: Page 15, first column, line 70, claim 22, before "air" insert --cooling--; and second column, line 16, claim 23, for "closing" read --rotated--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.